(12) United States Patent
Harazi et al.

(10) Patent No.: US 12,141,388 B2
(45) Date of Patent: Nov. 12, 2024

(54) TOUCH-SENSITIVE INTERFACE FOR MEASURING AN INTENSITY OF A PRESSING FORCE

(71) Applicant: VIBRA NOVA, Saint-Paul-de-Varces (FR)

(72) Inventors: Maxime Harazi, Saint-Martin-d'Hères (FR); Matthieu Rupin, Saint-Martin-d'Hères (FR); Miguel Moleron, Saint-Martin-d'Hères (FR)

(73) Assignee: VIBRA NOVA, Saint-Paul-de-Varces (FR)

( * ) Notice: Subject to any disclaimer, the term of this patent is extended or adjusted under 35 U.S.C. 154(b) by 0 days.

(21) Appl. No.: 18/547,702

(22) PCT Filed: Feb. 22, 2022

(86) PCT No.: PCT/EP2022/054421
§ 371 (c)(1),
(2) Date: Aug. 24, 2023

(87) PCT Pub. No.: WO2022/189142
PCT Pub. Date: Sep. 15, 2022

(65) Prior Publication Data
US 2024/0143101 A1 May 2, 2024

(30) Foreign Application Priority Data
Feb. 24, 2021 (FR) ....................................... 2101798

(51) Int. Cl.
*G06F 3/041* (2006.01)
*G01L 1/16* (2006.01)
*G06F 3/01* (2006.01)

(52) U.S. Cl.
CPC .............. *G06F 3/0414* (2013.01); *G01L 1/16* (2013.01); *G06F 3/016* (2013.01); *G06F 3/0416* (2013.01)

(58) Field of Classification Search
CPC ...... G06F 3/0414; G06F 3/016; G06F 3/0416; G06F 3/03547; G06F 3/04142; G01L 1/16
See application file for complete search history.

(56) References Cited

U.S. PATENT DOCUMENTS

| 10,860,107 | B2 | 12/2020 | Vezzoli et al. |
| 2019/0056837 | A1 | 2/2019 | Datta et al. |
| 2019/0354185 | A1* | 11/2019 | Vezzoli .................. G06F 3/044 |

FOREIGN PATENT DOCUMENTS

| EP | 2207080 A1 | 7/2010 |
| FR | 3061567 A1 | 7/2018 |
| WO | 2020141264 A1 | 7/2020 |

OTHER PUBLICATIONS

International Search Report for International Application No. PCT/EP2022/054421, mailed Jul. 19, 2022, 7 pages with English translation.

(Continued)

*Primary Examiner* — Jonathan A Boyd
(74) *Attorney, Agent, or Firm* — TraskBritt

(57) ABSTRACT

A touch interface includes a plate, at least one actuation transducer, at least one detector, and an amplification circuit. The plate defines a contact surface intended to be touched by an external body. The at least one actuation transducer is configured to make the plate vibrate as a function of an activation signal. The at least one detector is configured to detect an amplitude of a vibration of the plate and to generate a detection signal dependent on the detected vibration amplitude. The amplification circuit extends between an input and an output. The input is linked to the detector, and (Continued)

the output is linked to the actuation transducer. The interface also includes a processing unit configured to estimate an intensity of a pressing force exerted on the contact surface by the external body and to generate a force signal depending on the estimated intensity of the force.

19 Claims, 13 Drawing Sheets

(56) References Cited

OTHER PUBLICATIONS

International Written Opinion for International Application No. PCT/EP2022/054421, mailed Jul. 19, 2022, 15 pages with English machine translation.
Lulec et al. "MEMS cantilever sensor array oscillators: Theory and experiments," Sensors and Actuators A: Physical, vol. 237 (2016) (accepted Nov. 25, 2015), pp. 147-154.
Zhao et al. "A review on coupled MEMS resonators for sensing applications utilizing mode localization," Sensors and Actuators A: Physical, vol. 249 (2016) (accepted Jul. 15, 2016), pp. 93-111.
Zhao et al. "A Feasibility Study for a Self-Oscillating Loop for a Three Degree-of-Freedom Coupled MEMS Resonator Force Sensor," Procedia Engineering, vol. 120 (2015), pp. 887-891.

* cited by examiner

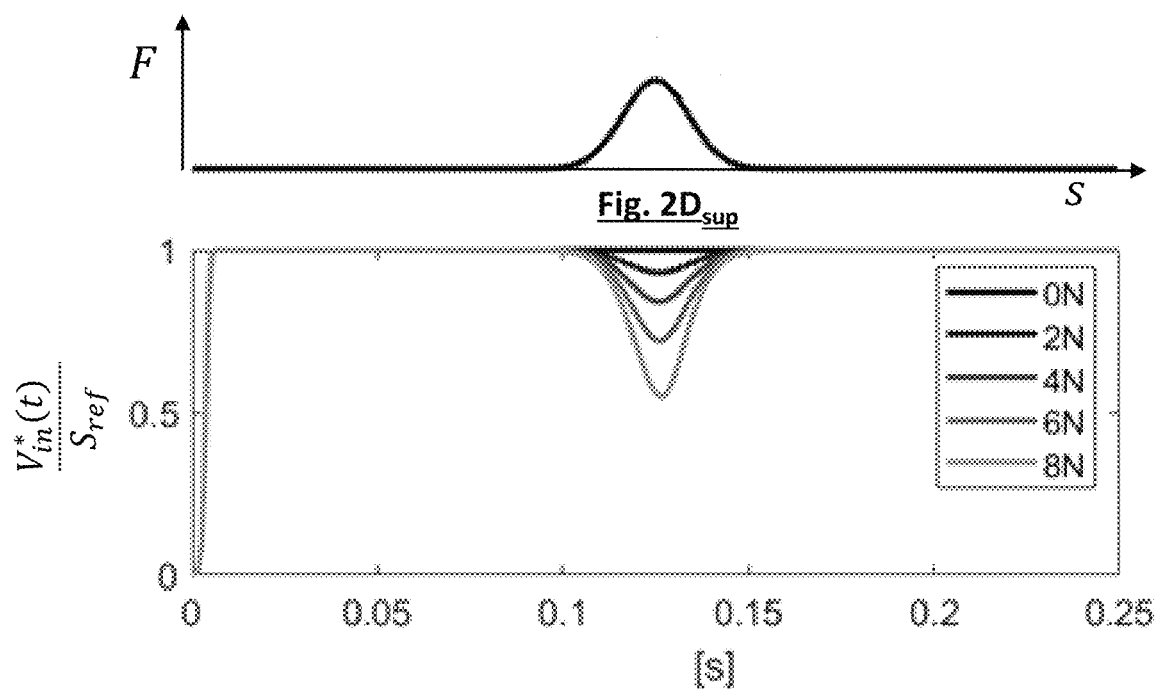
Fig. 2D_sup
Fig. 2D_inf

TOUCH-SENSITIVE INTERFACE FOR MEASURING AN INTENSITY OF A PRESSING FORCE

CROSS-REFERENCE TO RELATED APPLICATIONS

This application is a national phase entry under 35 U.S.C. § 371 of International Patent Application PCT/EP2022/054421, filed Feb. 22, 2022, designating the United States of America and published as International Patent Publication WO 2022/189142 A1 on Sep. 15, 2022, which claims the benefit under Article 8 of the Patent Cooperation Treaty to French Patent Application Serial No. FR2101798, filed Feb. 24, 2021.

TECHNICAL FIELD

The disclosure concerns a user interface configured to measure a pressing force exerted by an external body touching the contact surface of the interface.

BACKGROUND

Many devices currently marketed are controlled by touch interfaces. This type of interface generally comprises a touch surface, which allows a simple and interactive control of the device. The device can be a cellphone, a domestic electric appliance, a piece of equipment of a car, or a professional tool.

Most of the current touch screens comprise sensors allowing a detection of the contact of a finger by capacitive effect. For that, these screens comprise a contact surface, capacitively coupled to a transparent conductive mesh. That makes it possible to locate a zone of the screen touched by the finger of a user. The locating of the contact is efficient enough to make it possible to drive a device by the position of the finger or by a trajectory of the finger along the screen, or even by dynamic parameters of displacement of the finger, such as a speed or an acceleration. However, while the capacitive detection is efficient in locating a contact of a finger on the contact surface of a screen, it does not make it possible to quantify the force exerted by the finger. The contact detection is a detection of all-or-nothing type, and determines only the contact of a finger or the absence of contact.

The patent U.S. Pat. No. 10,860,107 describes a touch interface and a method that makes it possible to estimate an intensity of a pressing force exerted on a vibrating touch interface. The touch interface comprises a rigid plate, the latter being made to vibrate by actuation transducers. The actuation transducers are parameterized to generate a vibration of the plate according to a setpoint amplitude, the level of which is predetermined. The press of a finger on the plate leads to a variation of the vibration amplitude with respect to the setpoint amplitude, which makes it possible to detect the press and quantify the force exerted by the press on the plate.

The inventors have found that the approach described in this patent is reliable. However, some applications demand a significant measurement dynamic range, in other words an extended measurement range. These are, for example, applications in which there is a desire to determine the value of an operating parameter of a device, this value being able to vary within an extended range. The inventors have designed a touch interface that makes it possible to estimate an intensity of a pressing force exerted on a touch interface, one that exhibits an enhanced measurement dynamic range.

BRIEF SUMMARY

A first subject of the disclosure is an interface comprising:
- a plate, defining a contact surface intended to be touched by an external body;
- at least one actuation transducer, configured to make the plate vibrate as a function of an activation signal;
- at least one detector configured to detect an amplitude of a vibration of the plate and to generate a detection signal, the detection signal oscillating according to an oscillation amplitude dependent on the detected vibration amplitude; and
- an amplification circuit, extending between an input and an output, the input being linked to the detector and the output being linked to the actuation transducer;

the interface being characterized in that:
- the amplification circuit is configured to be powered by an input signal, the input signal being an oscillating signal established from the detection signal;
- the amplification circuit comprises an amplifier, configured to amplify the input signal, by applying to it an amplification gain, so as to address an output signal to the actuation transducer, the output signal corresponding to the amplified input signal, the output signal forming the activation signal of the actuation transducer; and
- the or each detector, the or each actuation transducer, and the amplification circuit form a feedback loop; and also characterized in that the interface comprises a processing unit, powered by a processing signal, the processing signal depending on the input signal or on the detection signal, the processing unit being configured to:
- compare the processing signal with a reference signal; and
- generate a force signal based on the comparison, the force signal being representative of an intensity of the force applied to the plate by the external body.

Preferably, the amplification gain depends, nonlinearly, on the input signal.

Thus, the plate and the feedback loop can form a self-sustaining oscillator.

According to one embodiment, the reference signal corresponds to the processing signal in the absence of force exerted on the plate by the external body.

The processing signal can be established from:
- a characteristic quantity of the input signal, the characteristic quantity quantifying the oscillation amplitude of the input signal; and/or
- an oscillation frequency of the input signal.

The processing signal can be established from:
- a characteristic quantity of the detection signal, the characteristic quantity quantifying the oscillation amplitude of the detection signal; and/or
- an oscillation frequency of the detection signal.

According to one embodiment, the amplification gain depends on a characteristic quantity of the input signal, the characteristic quantity quantifying the oscillation amplitude of the input signal. The amplification gain can decrease as a function of the characteristic quantity of the input signal.

The amplification gain can comprise a maximum gain weighted by a moderation term, such that the amplification gain is all the lower when the characteristic quantity of the input signal is high.

The amplification gain can be maximal when the characteristic quantity of the input signal reaches a predetermined minimum value.

The amplification gain can be minimal when the characteristic quantity of the input signal reaches a value greater than or equal to a threshold value.

According to one embodiment, a screen is attached to the plate, all or part of the plate being transparent.

The plate can exhibit a resonant vibration frequency lying between 20 kHz and 200 kHz.

At least one actuation transducer can be a piezoelectric transducer. At least one detector can be a piezoelectric transducer.

The interface can comprise a control unit, the control unit being configured to address a control signal to a device, linked to the interface, as a function of the force signal.

The interface can comprise a locating circuit, configured to determine a position of a point of contact between the external body and the plate.

The interface can comprise a filter, disposed between the detector and the amplification circuit, the filter being configured to define a frequency bandwidth of the input signal addressed to the amplification circuit. Thus, the input signal is obtained from a filtering of the detection signal.

According to one embodiment,
the plate is linked to at least one auxiliary transducer distinct from an actuation transducer, the auxiliary transducer being linked to an auxiliary power supply, the auxiliary transducer being configured to make the plate vibrate, according to a predetermined setpoint vibration amplitude, and according to an ultrasonic vibration frequency, so as to produce a haptic feedback effect; and
the interface is configured to activate the auxiliary transducer, or each auxiliary transducer, when the force signal crosses a predetermined threshold.

According to one embodiment, an actuation transducer is linked to a switch, the switch being configured to:
link the actuation transducer to the amplification circuit, so as to measure the force exerted on the plate; or
link the actuation transducer to an auxiliary power supply, such that the auxiliary power supply applies a setpoint signal to the actuation transducer, the actuation transducer being then configured to make the plate vibrate, according to a predetermined setpoint vibration amplitude, and according to an ultrasonic vibration frequency, so as to produce a haptic feedback effect.

A second subject of the disclosure is a method for estimating a force exerted on a plate of an interface according to the first subject of the disclosure, the method comprising:
a) application of an external body to the plate, by exerting a force on the plate; and
b) using the processing unit, estimation of an intensity of the force exerted by the external body on the plate.

A third subject of the disclosure is a method for controlling a device, using an interface according to the first subject of the disclosure, the device being parameterized by at least one operating parameter, the method comprising:
application of an external body to the plate, by exerting a force on the plate;
determination of an intensity of the force by the processing unit of the interface; and
as a function of the intensity of the force, generation of a control signal, by the interface, so as to adjust a value of the operating parameter of the device.

The interface can notably be a touch interface.

The external body can be a finger or a stylus.

Embodiments of the disclosure will be better understood on reading the explanation of the exemplary embodiments presented, hereinafter in the description, in association with the figures listed below.

BRIEF DESCRIPTION OF THE DRAWINGS

FIG. 2D, which consists of FIG. $2D_{sup}$ and FIG. $2D_{inf}$, comprises an upper part and a lower part. The upper part, i.e., FIG. $2D_{sup}$, represents the trend over time, in Gaussian form, of a pressing force applied to the interface (in newtons N). The lower part, i.e., FIG. $2D_{inf}$, shows different force signals, generated by a touch interface according to embodiments of the disclosure (y axis), as a function of time (x axis), for different applied force intensities, by following the time trend plotted in FIG. $2D_{sup}$. Each force signal is representative of the intensity of a force applied as a function of time.

In FIG. 3F, the force signals were determined by taking account of three different amplification gains, parameterized by a parameter n. Also represented are force signals obtained by implementing a configuration of the prior art.

DETAILED DESCRIPTION

Figure 1A:
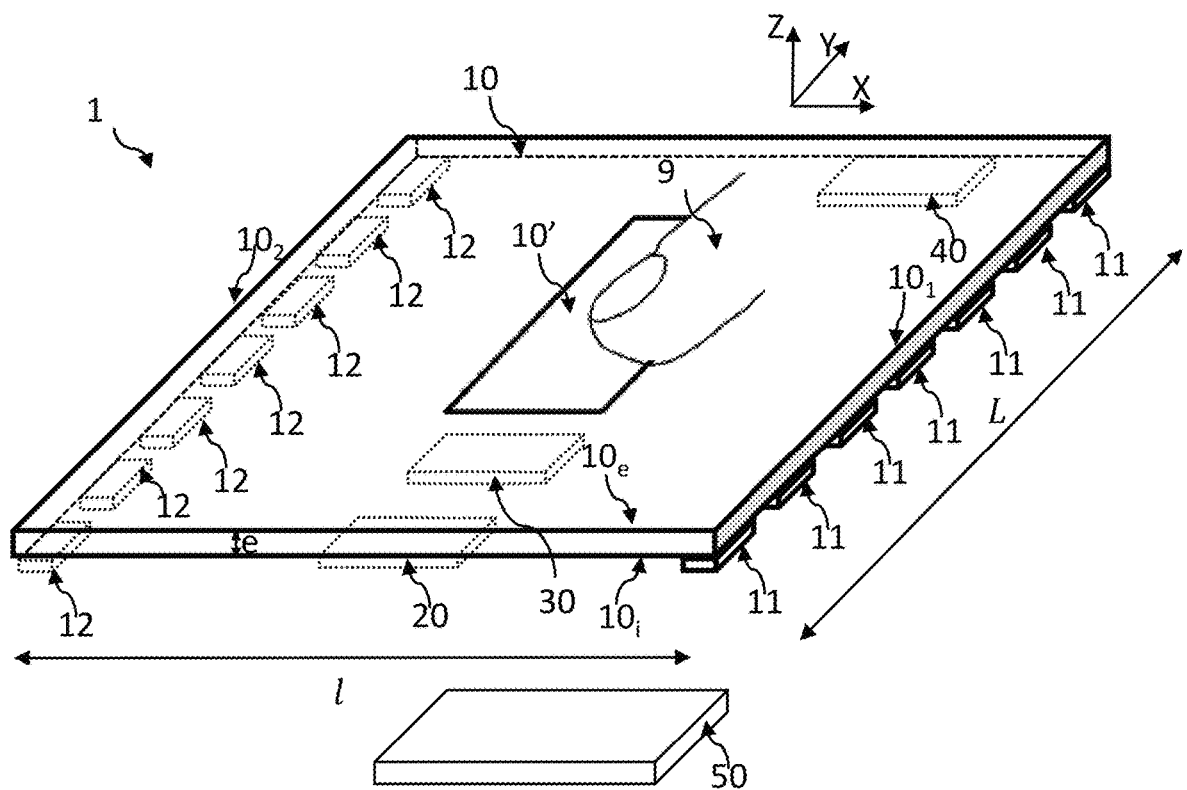
FIGS. 1A to 1E represent a first embodiment of a touch interface.

FIGS. 1A to 1E represent an example of interface 1 according to embodiments of the disclosure. The interface comprises a plate 10 intended to be touched by an external body 9. In the examples represented in this disclosure, the external body 9 is a finger, which corresponds to most of the disclosures envisaged. Alternatively, the external body 9 can be a stylus, or any means that makes it possible to act on the plate 10.

The interface is linked to a device 50. The device 50 can be, in a nonlimiting manner, a communication device, a computing device, a machine, a domestic electric appliance, or a dashboard of a vehicle. The operation of the device 50 is governed by at least one operating parameter. The touch interface 1 is intended to set a value of the operating parameter of the device 50.

The plate 10 comprises a setting zone 10', intended for the setting of the parameter under the effect of a press exerted by the finger 9. According to different possible applications:
- by pressing on the interface, beyond a certain force intensity, the interface can show an interactive menu or a virtual setting button;
- beyond a certain threshold of a pressing force on the interface, a virtual button of the interface becomes actuatable, so as to be able to set a parameter; and/or
- beyond a certain threshold of a pressing force on the interface, the interface can generate a haptic feedback, for example a click effect.

According to another possible application, the value of the parameter is progressively increased when the finger presses on the plate, in the setting zone. The device is, for example, a multimedia system of a vehicle. The parameter can, for example, be the sound volume of the multimedia system. The greater the pressure, the higher the sound volume.

The plate 10 is rigid. It extends between an outer face $10_e$ and an inner face $10_i$. The outer face $10_e$ forms a contact surface, intended to be touched by the finger 9. The inner face $10_i$ and the outer face $10_e$ extend preferably parallel to one another. The distance between the outer face $10_e$ and the inner face $10_i$ defines a thickness "e" of the plate. The thickness e of the plate is dimensioned to allow a vibration of the plate 10, preferably according to an ultrasonic vibration frequency. The thickness e of the plate 10 is preferably less than 10 mm, even less than 5 mm. The thickness e is adjusted as a function of the nature of the material and of its mechanical properties (rigidity, solidity). It, for example, lies between 1 mm and 5 mm for glass or a material such as Plexiglass.

In the example represented, the inner face $10_i$ and the outer face $10_e$ are flat, which corresponds to the configuration that is the simplest to manufacture. The plate extends, parallel to a lateral axis X, by a width l, and, parallel to a longitudinal axis Y, by a length L. The length L and the width l can lie between 5 cm and a few tens of cm, for example 30 cm, or even more. The lateral axis X and the longitudinal axis Y define a main plane $P_{XY}$. In other examples, the inner face $10_i$ and/or the outer face $10_e$ can be curved. The surface area of the plate 10 is preferably greater than 1 cm², even 10 cm² or 50 cm².

The plate 10 is formed by a rigid material, such as glass, or a polymer, or wood, or a metal, or a semiconductor, for example silicon. The plate 10 can be transparent or opaque. The plate 10 can comprise opaque parts and transparent parts.

In this example, the plate 10 is delimited, according to the lateral axis X, by a first lateral border $10_1$ and a second lateral border $10_2$.

The plate is intended to be made to vibrate, in particular according to a spontaneous vibration, self-sustaining as described hereinbelow. A spontaneous vibration is understood to mean a vibration that is not initially specified as a function of a setpoint addressed to the actuation system, in particular an amplitude and/or frequency setpoint. In the vicinity of the first lateral border $10_1$, the plate 10 is linked to one or more detectors 11. "In the vicinity" is understood to mean at a distance of preferably less than 2 cm. In this example, each detector 11 is a piezoelectric transducer used as sensor. Each detector 11 has no motor action on the plate 10, but allows a detection of the vibration amplitude of the plate according to a sampling frequency. The sampling frequency is, for example, equal to a few kHz, a few tens of kHz, or a few hundreds of kHz.

In the vicinity of the second lateral border $10_2$, one or more actuation transducers 12 are linked to the plate 10.

The actuation transducers 12 are configured to be activated by an electrical activation signal. Under the effect of the activation signal, the actuation transducers exert a pressure on the plate 10 so as to produce a local deformation of the plate, for example in a direction at right angles to the plate. When the activation signal is periodic, the deformation of the plate 10 is periodic, which leads to a formation of a vibration 19. The vibration can, for example be generated by a bending wave formed through the plate. The bending wave can be a standing or traveling wave. According to other possibilities, the vibration can be a wave other than a bending wave, for example a compression wave. An example of vibration 19 is schematically represented in FIGS. 1C and 1D.

The disposition of the detectors 11 and of the actuation transducers 12 at the border of the plate 10 does not constitute a necessary condition: the detectors or the transducers can be disposed according to other configurations, for example in the form of a row, in the middle of the plate, or of a matrix, or at positions advantageously chosen as vibration antinodes in the case of a standing wave. The position of the vibration antinodes can be determined by simulation or by prior experimental characterization.

Each detector 11 and/or each actuation transducer 12 can be a transducer of piezoelectric type, comprising a piezoelectric material, for example AlN, ZnO or PZT, disposed between two electrodes. It can, for example, be the reference PZT 406. The detectors 11 or the actuation transducers 12 can be such that the piezoelectric material is deposited, in the form of one or more thin layers, between polarization electrodes.

Alternatively, a detector or an actuation transducer can be an electromechanical resonator, for example of MEMS (microelectromechanical system) type, or of electrorestrictive or magnetorestrictive type.

The interface 1 comprises an amplification electronic circuit 20 (also referred to herein as an "amplification circuit"), linked to at least one detector 11 and to an actuation transducer 12. The function of the amplification electronic circuit is described in association with FIGS. 1B to 1E. In this example, the amplification electronic circuit 20 is disposed under the plate 10.

The touch interface 1 comprises a processing unit 30, intended to estimate a pressing force exerted by the external body 9 on the plate 10. The function of the processing unit 30 is described in association with FIGS. 1B to 1E.

The touch interface 1 comprises a control unit 40, intended to drive the device 50 driven by the interface. In this example, the control unit 40 transmits the value of the operating parameter, resulting from the action of the finger 9 on the plate, to the device 50. The control unit 40 can comprise a microprocessor, so as to be able to establish a control signal as a function of a force level resulting from the processing unit 30.

Figure 1B:
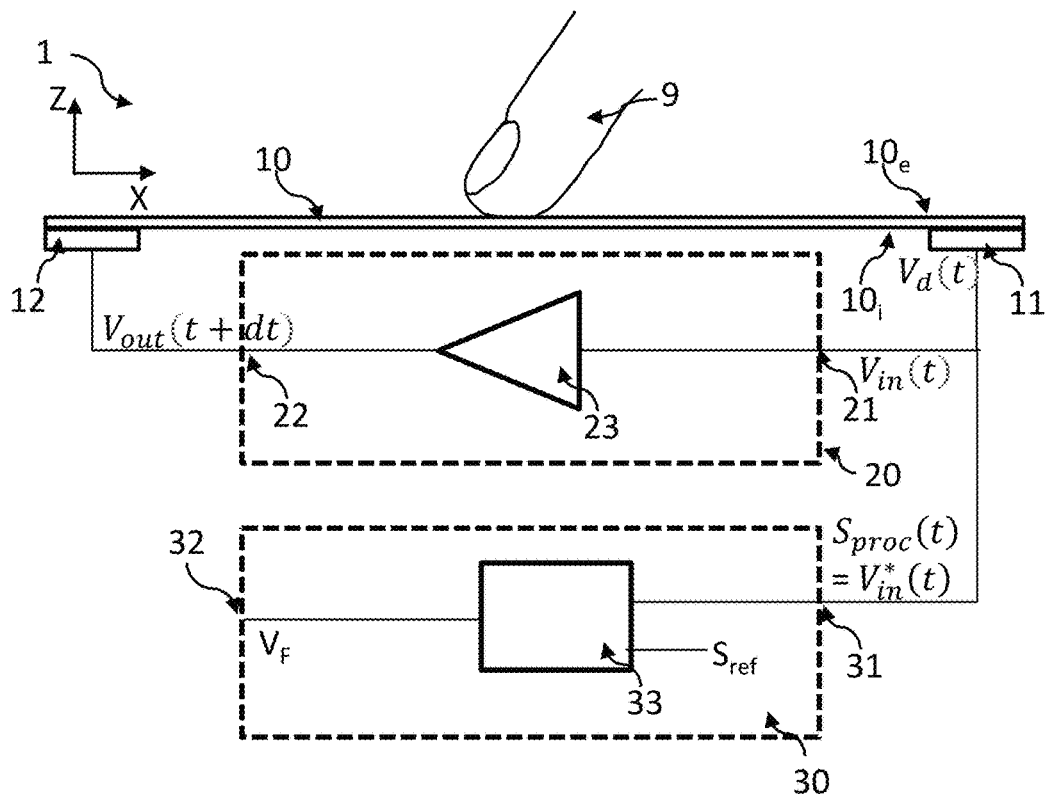
Figure 1C:
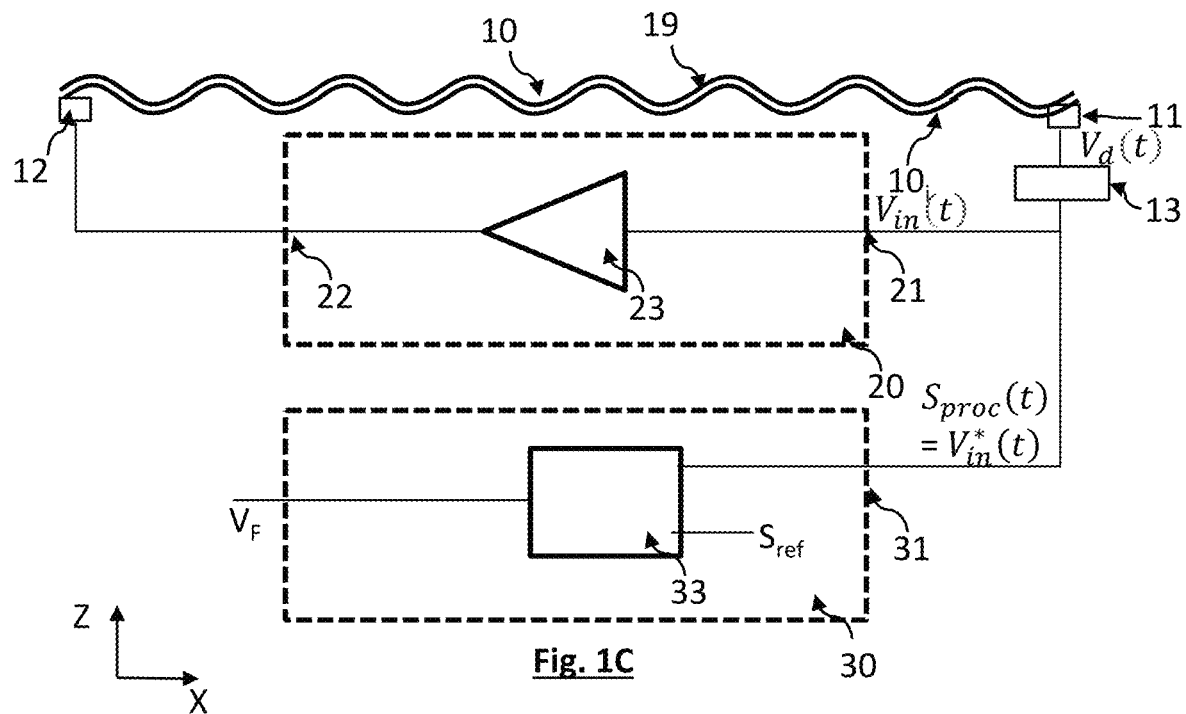
Figure 1D:
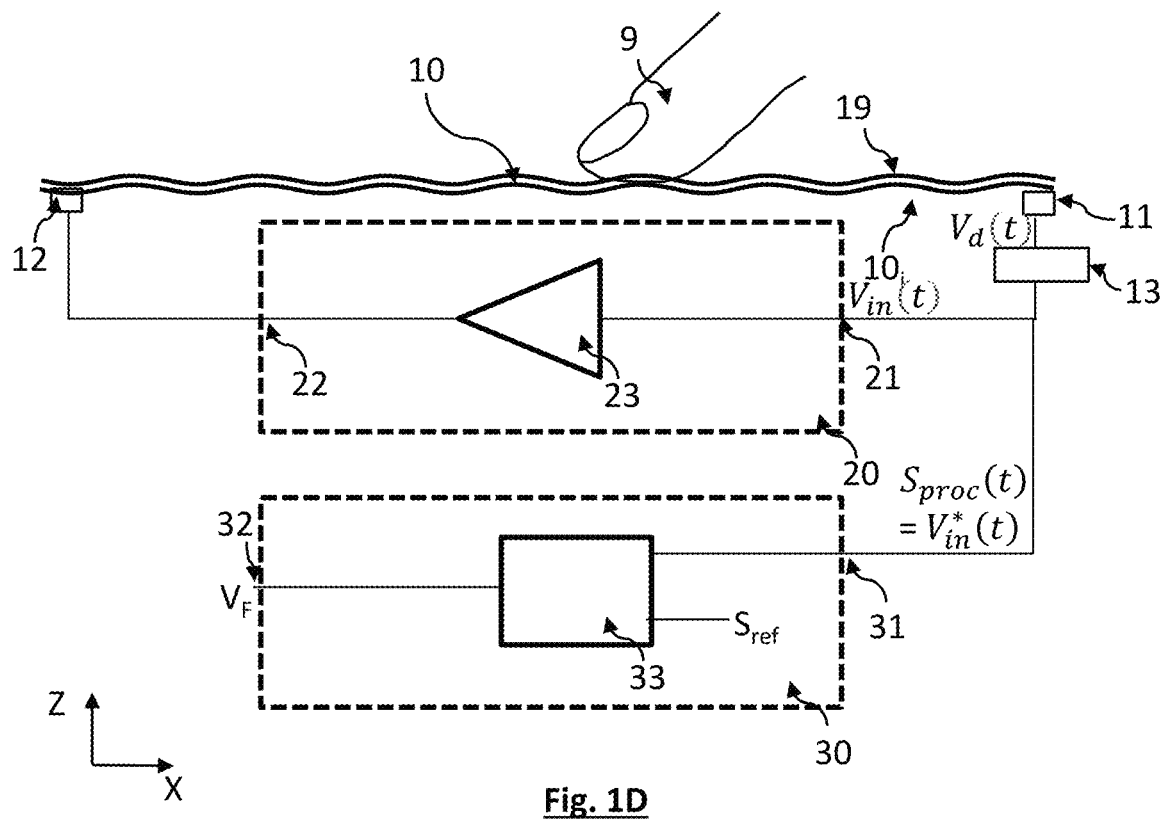

FIG. 1B represents a cross-sectional view of the touch interface. The amplification circuit 20 extends between an input 21 and an output 22. The input of the amplification circuit is linked to at least one detector 11. The output 22 of the amplification circuit is linked to at least one actuation transducer 12. The amplification circuit 20 comprises an amplifier 23, intended to amplify the input signal $V_{in}(t)$, delivered by the detector 11 at an instant t, so as to establish an output signal $V_{out}(t+dt)$, at a subsequent instant t+dt, such that:

$$V_{out}(t+dt) = g(t) V_{in}(t) \quad \text{Expression (1)}$$

in which g(t) corresponds to an amplification gain, and dt depends on the sampling frequency. More specifically, dt is the inverse of the sampling frequency.

The output signal $V_{out}(t+dt)$ resulting from the amplification circuit 20 forms an activation signal of the actuation transducer 12 at the instant t+dt.

The amplification gain g(t) is, for example, such that:

$$\text{Expression (2)}$$
$$V_{out}(t+dt) =$$
$$g(t)V_{in}(t) = \begin{cases} G\alpha\left[1 - \left(\frac{V^*_{in}(t)}{V^*_{max}}\right)^n\right]V_{in}(t) & V^*_{in}(t) < V^*_{max} \\ 0 & V^*_{in}(t) \geq V^*_{max} \end{cases}$$

wherein:

$$g(t) = G\alpha\left[1 - \left(\frac{V^*_{in}(t)}{V^*_{max}}\right)^n\right]$$

is the amplification gain;

G is a gain called "critical gain";

α is a positive real number strictly greater than 1, allowing an adjustment of the value of a maximum gain Gα, the maximum gain being positive;

n is a strictly positive real number;

$V^*_{in}(t)$ is a positive characteristic quantity of $V_{in}(t)$, $V^*_{in}(t)$ being, for example, an estimation of the root mean square (RMS) value of $V_{in}(t)$, or an estimation of the oscillation amplitude of $V_{in}(t)$, wherein $V^*_{in}(t)$ can be calculated from $V_{in}(t)$ by taking account of a period or several periods, for example between 10 and 100 periods, or, alternative, $V^*_{in}(t)$ can be equal to $|V_{in}(t)|$, and wherein, more generally, a characteristic quantity is understood to be a quantity that makes it possible to quantify the oscillation amplitude of a periodic signal;

$V^*_{max}$ is a maximum threshold value of $V^*_{in}(t)$ beyond which g(t)=0; and $$\left[1 - \left(\frac{V^*_{in}(t)}{V^*_{max}}\right)^n\right]$$

is a moderation term, the effect of which, on the amplification gain, is described hereinbelow.

In the rest of the description, in a nonlimiting manner, $V^*_{in}(t)$ is the root mean square value of $V_{in}(t)$.

The signals $V_{in}$ and $V_{out}$ are alternating signals (i.e., oscillating), because of the vibration of the plate, the quantities $V_{in}(t)$ and $V_{out}(t)$ correspond to instantaneous signals at each instant t. The input signal $V_{in}$ is formed from a detection signal $V_d$ resulting from a detector 11. In this example, the input signal $V_{in}$ corresponds to the detection signal $V_d$, that is to say $V_{in}=V_d$. According to other possibilities, the input signal $V_{in}$ is established from the detection signal $V_d$. It can, for example, be a filtered detection signal, as described hereinbelow. The parameters α, n and $V^*_{max}$ make it possible to adjust the amplification gain g(t), that is to say a range of variation of $V_{out}(t+dt)$ as a function of $V_{in}(t)$.

The parameters α and n make it possible to adjust the response of the force measurement system, a response that is explained hereinbelow in association with FIGS. 3F and 3G.

The lower $V^*_{in}(t)$ becomes, the more the amplification gain g(t) tends toward the maximum gain Gα. The maximum gain is reached when $V^*_{in}(t)$ reaches a predetermined value, in this example equal to 0. When $V^*_{in}(t)$ tends toward $V_{max}$, the amplification gain $$g(t) = G\alpha\left[1 - \left(\frac{V^*_{in}(t)}{V^*_{max}}\right)^n\right]$$

decreases, and tends toward a minimum value that is here equal to 0. Thus, the amplification gain g(t) is a decreasing function of $V^*_{in}(t)$.

An important aspect of embodiments of the disclosure is that the (or each) detector 11, the amplification circuit 20 and the (or each) actuation transducer 12 forms a feedback loop linked to the plate 10. When the detector 11 picks up a vibration of the plate, it generates a detection signal $V_d(t)$, from which an input signal $V_{in}(t)$ of the amplification circuit 20 is formed, the RMS value of which is $V^*_{in}(t)$. The input signal $V_{in}(t)$ is amplified by the amplification circuit 20, subject to $V^*_{in}(t) < V^*_{max}$. The amplification circuit 20 establishes an output signal $V_{out}(t+dt) = g(t)V_{in}(t)$, the latter being addressed to the actuation transducer 12. The plate 10 and the feedback loop then behave as a self-sustaining oscillator: the oscillation is maintained according to an amplitude that is stabilized. The energy losses, at the plate (attenuation of the vibration) or at the plate/detector or plate/transducer interfaces are compensated by the amplification circuit 20, the latter being powered by an external electrical power supply. It will be noted that, contrary to the interface described in the prior art, the plate does not vibrate according to a predetermined setpoint amplitude or frequency. When the aim is to measure an intensity of a force, the actuation transducer of the plate is not controlled so as to make the plate vibrate according to a setpoint amplitude or frequency. The plate vibrates according to a spontaneous amplitude, resulting from oscillation that is self-sustained by the oscillator formed by the plate and the feedback loop.

Like any mechanical system, the plate has vibration modes (resonance frequencies and amplitude) that are specific to it. The plate spontaneously enters into vibration according to a resonance frequency, dependent on the material, on the dimensions of the plate, on the position of the (or of each) actuation transducer 12 and of each detector 11, as well as the electrical circuits forming the feedback loop. It is preferable for the resonance frequency of the plate to be ultrasonic. That renders the vibration inaudible to a user touching the interface or the plate. The resonance frequency preferably lies between 20 kHz and 200 kHz.

Alternatively, the plates can enter into vibration by a priming of one or more actuation transducers 12. According to this alternative, a brief priming signal, for example sinusoidal, is addressed so as to initiate the vibration. The latter is then self-sustained because of the action of the feedback loop. The priming signal can be produced by the amplification circuit 20. The frequency of the priming signal is preferably defined beforehand, on the basis of a modeling or of a priori as to the frequency of the oscillations of the plate.

According to one possibility, for reasons of ease of integration with existing electronic circuits, the oscillation frequency can be imposed.

The value of the critical gain G can be determined on the basis of experimental feedback or tests. It corresponds to the value from which the signal $V_{in}(t)$ is of constant and stabilized amplitude over a time window, by using an amplification gain $g_{lin}$ that is constant (i.e., independent of $V_{in}(t)$), as described in association with Expression (2'). By implementing a constant amplification gain, the relationship between $V_{out}(t+dt)$ and $V_{in}(t)$ is linear:

$$V_{out}(t+dt) = g(t)(V_{in}(t)) = g_{lin} V_{in}(t) \qquad \text{Expression (2')}$$

In other words, G can be the minimum value of $g_{lin}$ from which the system, implementing the linear amplification gain $g_{lin}$, is oscillated.

In a test phase, the value of the critical gain G can be determined, by using the linear relationship explained in Expression (2'), in such a way that the system formed by the plate and the feedback loop behave as an oscillator: the amplitude of the signal $V_{in}(t)$ reaches a non-zero value, that is constant and stabilized over a time window. This value of the critical gain G can then be used in the amplification gain $g(t)$ described in Expression (2).

Alternatively, the value of the critical gain G can be determined on the basis of tests by directly using the oscillating system based on the amplification gain $g(t)$ described in Expression (2), by searching for the minimum value of G beyond which the system becomes oscillating with $\alpha=1$.

Alternatively, different values of $G\alpha$ can be tested in succession until the signal $V_{in}(t)$ reaches a non-zero amplitude that is constant and stabilized over a time window. In this case, the gain $g(t)$ tends toward the critical gain G.

When the oscillator operates according to a self-oscillation regime, by considering the amplification gain $g(t)$ explained in Expression (2), $g(t)$ tends toward G.

In the self-sustaining self-oscillation regime, the mechanical energy of the oscillation, dissipated in the plate, is compensated by the electrical energy injected by the amplification circuit. The latter provides the energy needed to maintain the oscillation.

In Expression (2), the parameter $\alpha$ corresponds to a multiplying factor, such that the maximum gain $G\alpha$ is sufficiently greater than the critical gain G for the system to still be oscillated. The parameter $\alpha$ can, for example, lie between 1 and 10.

In Expression (2), the term $$\left[1 - \left(\frac{V_{in}^*(t)}{V_{max}^*}\right)^n\right]$$

is a moderation term, that makes it possible to adjust the amplification gain $g(t)$ as a function of the value of $V_{in}^*(t)$. The moderation term generally lies between 0 and 1. It becomes all the lower when the value of $V_{in}^*(t)$ is high. The moderation term makes it possible to obtain a stability of the self-oscillation, which is called self-sustaining oscillation. Self-sustaining oscillation is understood to mean an oscillation whose amplitude, in the absence of external disturbance, is stable, or considered as such, to within statistical fluctuations. An example of self-sustaining oscillation is illustrated in FIG. 2C described hereinbelow.

Thus, the amplification gain $g(t)$ comprises the maximum gain $G\alpha$, which induces the oscillation, as well as the moderation term $$\left[1 - \left(\frac{V_{in}^*(t)}{V_{max}^*}\right)^n\right],$$

which makes it possible to obtain an oscillation that is stable in time.

Amplification gains that exhibit analytical forms that differ from that explained in Expression (2) are possible. It is, for example possible to use another amplification gain $g(t)$, preferably nonlinear with respect to $V_{in}^*(t)$. Generally, it is preferable for the amplification gain $g(t)$ to include a positive amplification term, in this case the maximum gain $G\alpha$ and a moderation term $$\left[1 - \left(\frac{V_{in}^*(t)}{V_{max}^*}\right)^n\right],$$

that is nonlinear with respect to $V_{in}^*(t)$, and decreasing as a function of $V_{in}^*(t)$. That makes it possible to obtain a self-sustaining oscillation, that is to say an oscillation of amplitude that is stable in time, in the absence of strain exerted on the plate.

When the external body exerts a pressing force on the plate 10, the self-oscillation of the plate is disturbed. The result thereof is a variation of the detection signal $V_d(t)$, detected by a detector 11. The result thereof is a variation of the input signal, the latter depending on the detection signal. The variation of the detection signal $V_d(t)$ or of the input signal $V_{in}(t)$ is exploited by the processing unit 30. The processing unit 30 comprises an input 31 and an output 32. The processing unit is powered by a processing signal $S_{proc}(t)$. Generally, the processing signal addressed to the processing unit depends on the input signal $V_{in}(t)$, or on the detection signal $V_d(t)$. In the example represented (FIGS. 1B, 1C and 1D), the processing signal $S_{proc}(t)$ is a characteristic quantity $V_{in}^*(t)$ of the input signal $V_{in}(t)$, the characteristic quantity being, for example, the RMS value: $S_{proc}(t) = V_{in}^*(t)$.

The processing signal $S_{proc}(t)$ can also be a characteristic quantity $V_{out}^*(t+dt)$ of the output signal $V_{out}(t+dt)$, the latter corresponding to the amplified input signal. The processing signal $S_{proc}(t)$ can also be the amplification gain $g(t)$. The processing signal $S_{proc}(t)$ can also be a frequency of the input signal. Generally, the processing signal $S_{proc}(t)$ is determined from $V_{in}(t)$, and, for example, from a characteristic quantity $V_{in}^*(t)$ of $V_{in}(t)$. The fact that $V_{in}^*(t)$ is generally a monotonic function of the intensity F of the applied force is used. According to one possibility, $S_{proc}(t)$ depends on the frequency of $V_{in}(t)$. The fact that the frequency of $V_{in}(t)$ can vary, notably according to a monotonic function, as a function of the intensity F of the applied force, is then used.

The processing unit 30 comprises a comparator 33, allowing a comparison between the processing signal $S_{proc}(t)$ and a reference value $S_{ref}$. In this example, the comparison is a ratio $$\frac{S_{proc}(t)}{0S_{ref}}.$$

It could also be a difference. The comparator 33 generates a force signal $V_F$, representative of the comparison between $S_{proc}(t)$ and $S_{ref}$. The force signal $V_F$, equal or proportional to $$\frac{S_{proc}(t)}{S_{ref}},$$

is representative of the force exerted by the finger 9 on the plate 10.

Preferably, without that being a necessary condition, the relationship between the force signal $V_F$ and the intensity F of the pressing force is linear.

FIG. 1C represents the plate 10 in a reference configuration. No force is applied to the plate. In this representation, the amplitude of the vibration 19 has been exaggerated. In fact, the amplitude of the vibration of the plate is of a few µm or a few tens of µm, typically between 0.1 µm and 50 µm. Following an initial vibration, the oscillator formed by the plate and the feedback loop balances out, and the plate enters into a free, self-sustaining and stable vibration mode. The triggering of the self-sustaining oscillation can be an uncontrolled vibration of the plate, following a movement of the interface 1. It can also be a vibration induced by an electronic noise in the electronic circuits forming the feedback loop. The effect of the electronic noise is then amplified by the amplifier, which leads to an activation of the actuation transducer 12 and to the vibration of the plate.

In the reference configuration, the plate gradually and spontaneously reaches a reference operating regime that is stabilized and self-sustaining, characterized by a vibration amplitude and frequency. The RMS value $V^*_{in}(t)$ of the signal $V_{in}(t)$ resulting from the detector 11 then reaches a reference value $S_{ref}$ that is stored in the processing unit 30. Thus, the reference value $S_{ref}$ results from the spontaneous oscillation of the plate in the absence of a press on the interface by a user. It is not a predetermined value. Thus, generally, $S_{ref}$ corresponds to the value of $S_{proc}(t)$ in the absence of a press exerted on the plate.

FIG. 1D represents a measurement configuration, in which a finger 9 presses on the plate 10. The pressing force exerted by the finger is reflected by an attenuation of the vibration amplitude 19 of the plate 10. That leads to a reduction of the RMS value $V^*_{in}(t)$ of the signal resulting from the detector 11. The contact with the finger modifies the transfer function of the actuation transducer, plate and sensor system. Under the effect of the feedback loop, the oscillator is stabilized at a new operating point. The result thereof is a new RMS value $V^*_{in}(t)$ corresponding to the oscillator modified by the press of the finger. The comparison $$\frac{S_{proc}(t)}{S_{ref}} = \frac{V^*_{in}(t)}{S_{ref}}$$

makes it possible to quantify the intensity of the pressing force exerted by the finger on the plate.

An important aspect of embodiments of the disclosure is that the plate and the feedback loop form a self-sustaining oscillator. When $V^*_{in}(t)$ decreases, under the effect of the press exerted on the plate, the amplification circuit 20 makes it possible to maintain an oscillation that can be measured by the detector 11. The oscillator makes it possible to obtain a measurable value $V^*_{in}(t)$, including for low levels, when the press exerted on the plate is high. The oscillation sustained by the amplification circuit 20 allows a measurement of intensities of force according to a wide dynamic range. One very advantageous aspect of embodiments of the disclosure is that the parameter n makes it possible to adjust the response of the device, so as to prioritize the measurement dynamic range or sensitivity, as described hereinbelow, in association with FIGS. 3F and 3G.

According to one possibility, a filter 13 is disposed between the sensor (or each sensor) and the amplification circuit 20. It can notably be a bandpass filter, so as to define a bandwidth of acceptable vibration frequencies. The recourse to such a filter makes it possible to avoid the establishment of the self-oscillation in frequencies outside of the bandwidth of the filter. The filter 13, which is optional, is represented in FIGS. 1C and 1D. The input signal $V_{in}(t)$ then corresponds to the filtered detection signal $V_d(t)$.

Figure 1E:
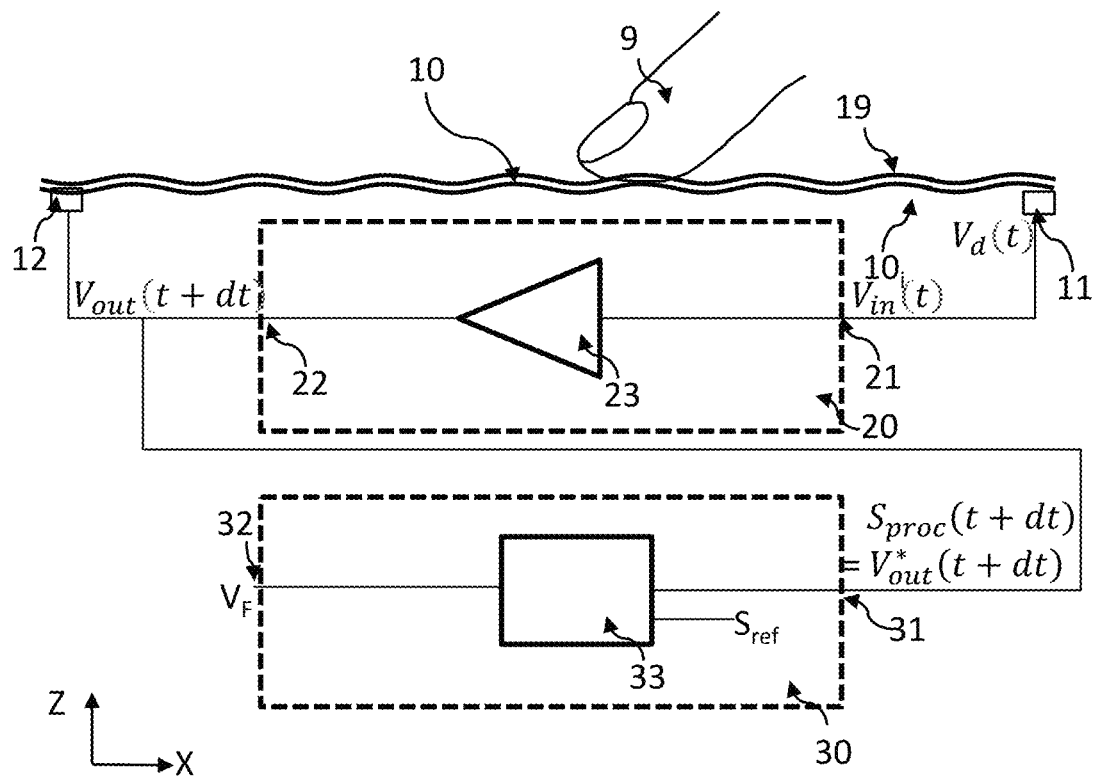

According to a variant, represented in FIG. 1E, the processing unit 30 is powered by the signal $V_{out}(t+dt)$ resulting from the amplification electronic circuit 20. In this case, the processor unit 30 makes a comparison between the RMS value of $S_{proc}(t+dt)=V^*_{out}(t+dt)$ and a reference value $S_{ref}$. The comparator 33 generates a force signal $V_F$, representative of the comparison between $S_{proc}(t+dt)$ and $S_{ref}$. In a way similar to what has been described previously, the force signal $V_F$, representative of the force exerted on the plate, is equal or proportional to $$\frac{S_{proc}(t)}{S_{ref}}.$$

Regardless of the embodiment, the reference value $S_{ref}$ can correspond to the processing signal $S_{proc}(t)$ in the absence of force exerted on the plate, while the latter oscillates according to the stable self-oscillation regime.

Figure 2A:
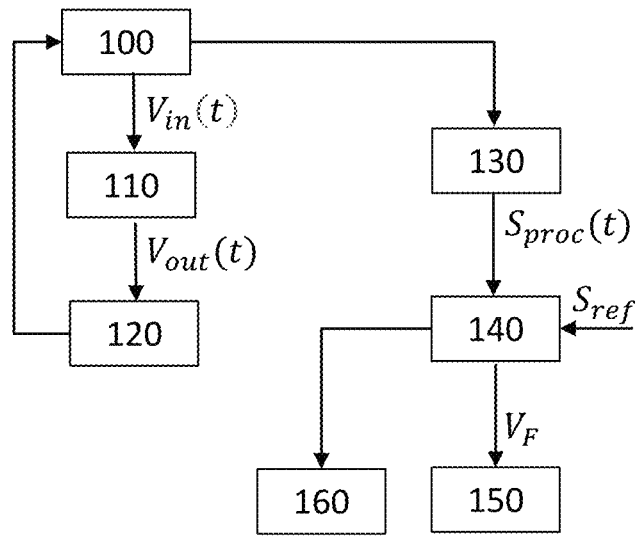
FIG. 2A schematically represents the main steps of a method for estimating an intensity of a force by implementing an interface according to embodiments of the disclosure.

FIG. 2A represents the main steps of a method for estimating a force exerted on the plate.

Step 100: measurement of an instantaneous value of an input signal $V_{in}(t)$ from the signal $V_d(t)$ detected by a detector 11 at an instant t.

Step 110: calculation, by the amplification circuit, of a value $V_{out}(t+dt)=g(t)V_{in}(t)$.

Step 120: powering of an actuation transducer using the signal $V_{out}(t+dt)$, then reiteration of the steps 100 to 120.

When the steps 100 to 120 are performed without pressing force exerted on the plate, the RMS value $V^*_{in}(t)$ spontaneously reaches a stable reference value $V_{ref}$, under the effect of the self-sustaining oscillation previously described. The reference value $V_{ref}$ can be stored in the processing unit 30. As previously described, the step 110 can assume a calculation of an RMS value $V^*_{in}(t)$ of the input signal $V_{in}(t)$. Alternatively, the amplification gain g(t) can use a characteristic quantity of the input signal $V_{in}(t)$, different from the RMS value: it can, for example, be the oscillation amplitude of $V_{in}(t)$ or the absolute value of $V_{in}(t)$.

Figure 2B:
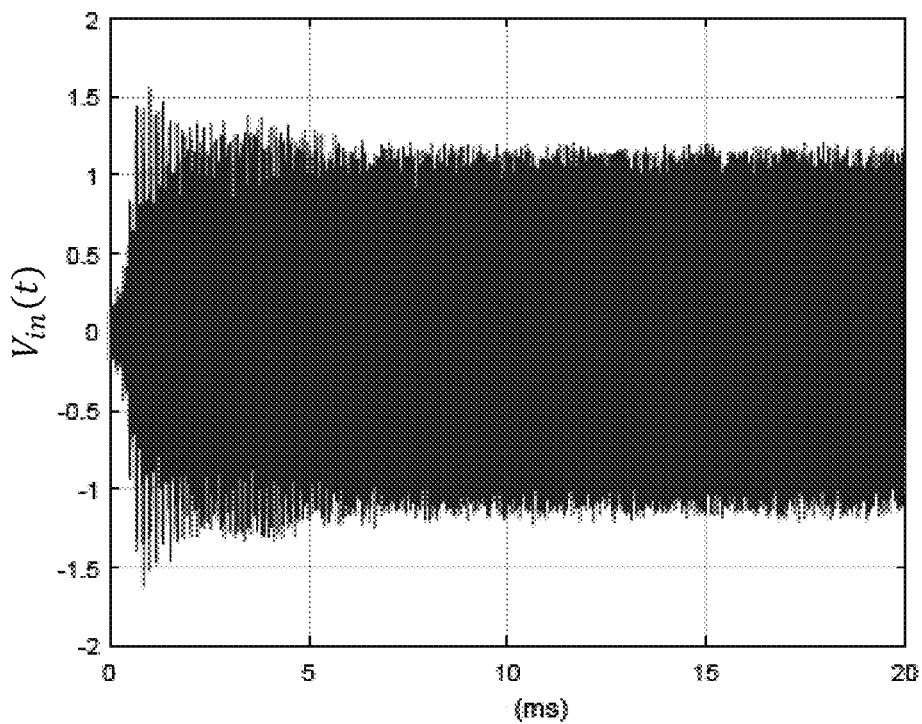
FIG. 2B illustrates the establishing of a sustained self-oscillation regime on a plate coupled to a feedback loop.
Figure 2C:
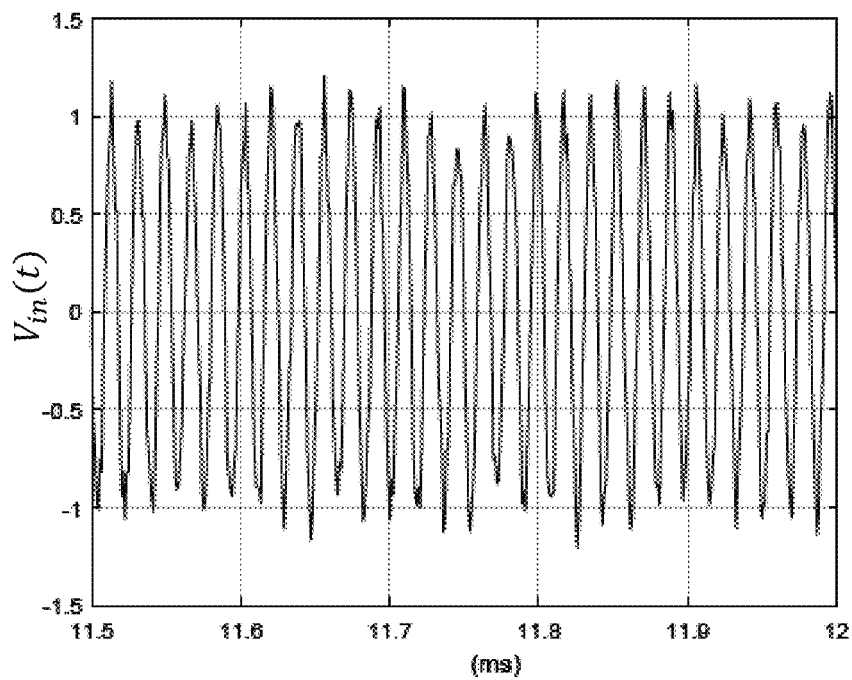
FIG. 2C is a detail of FIG. 2B.

FIG. 2B represents a quasi-instantaneous setting up of an operating regime in self-sustaining oscillation mode. The x axis is the time (seconds unit), while the y axis corresponds to the amplitude of the vibration measured by a detector (volts unit). From the instant t=0, under the effect of electronic noises, the oscillator, formed by the plate and the feedback loop, enters into a self-oscillating regime, according to an amplitude $V_{ref}$ that is stable, or that can be considered as stable. FIG. 2C is a detail of FIG. 2B according to a short time range.

Step 130: formation of the processing signal $S_{proc}(t)$. As previously indicated, the processing signal $S_{proc}(t)$ is established from $V_{in}(t)$. It can notably be established from a characteristic quantity $V^*_{in}(t)$ of $V_{in}(t)$ or from the frequency of $V_{in}(t)$. Remember that the term "characteristic quantity" designates a quantity that quantifies the amplitude of the oscillation of a periodic signal. In this example, the processing signal $S_{proc}(t)$ is the RMS value $V^*_{in}(t)$ of the input signal. According to other possibilities, it can be the maximum value. Alternatively, during the step 130, the processing signal $S_{proc}(t)$ is established from a characteristic quantity $V^*_{out}(t+dt)$ of the output signal $V_{out}(t+dt)$.

Step 140: estimation of an intensity of a pressing force.

Step 140 is implemented by the processing unit 30, which calculates the force signal $V_F$ as a function of the characteristic quantity resulting from the step 130 and $S_{ref}$. The force signal $V_F$ is representative of the intensity F of the pressing force exerted on the plate. The conversion between $V_F$ and F can be obtained by calibration. The force signal $V_F$ can be established from the RMS value of $V_{in}(t)$ (or of $V_{out}(t+dt)$) or of other characteristic quantities (maximum value, for example). In this example, the processing signal $S_{proc}(t)$ is the RMS value $V^*_{in}(t)$ of the input signal. The force signal $V_F$ results from a comparison between the processing signal $S_{proc}(t)$ and the reference signal $S_{ref}$, the latter being equal to the reference value $V_{ref}$, which corresponds to the value of $V^*_{in}(t)$ in the absence of force being pressed on the plate.

Step 150: (optional) determination of a value of an operating parameter of the device 50.

The step 150 is implemented by the control unit 40. Based on the force applied, an operating parameter of the device 50, controlled by the interface 1, can be set. The operating parameter can be determined in a range of values, each value having an associated force intensity. The operating parameter can also comprise only two possible values, for example, 0 in the absence of force and 1 in the presence of a pressing force, the intensity of which is greater than a certain threshold.

FIG. 2D illustrates a simulation of implementation of the amplification gain g(t) previously described, on a plate of aluminum 100 mm long, 10 mm wide and 1 mm thick, by considering α=1.5 and n=3. A press was simulated, taking the form of a gaussian centered on t=0.125 s, according to different maximum force intensities F, measured in Newtons (N) at the peak of the gaussian, and lying between 0 N (zero Newtons–absence of force) and 8 N. FIG. $2D_{sup}$ shows the trend over time of the force applied to the plate. FIG. $2D_{inf}$ shows a trend over time of the force signal $V_F(t)$ (y axis), the time corresponding to the x axis (unit: seconds). It will be observed that the application of a force of increasing intensity results in a reduction of the force signal $V_F$, the minimum value reached being equal to 0.5. FIG. 2D illustrates the capacity of embodiments of the disclosure to establish an accurate quantification of an intensity of a pressing force, according to an extended range.

Figure 2E:
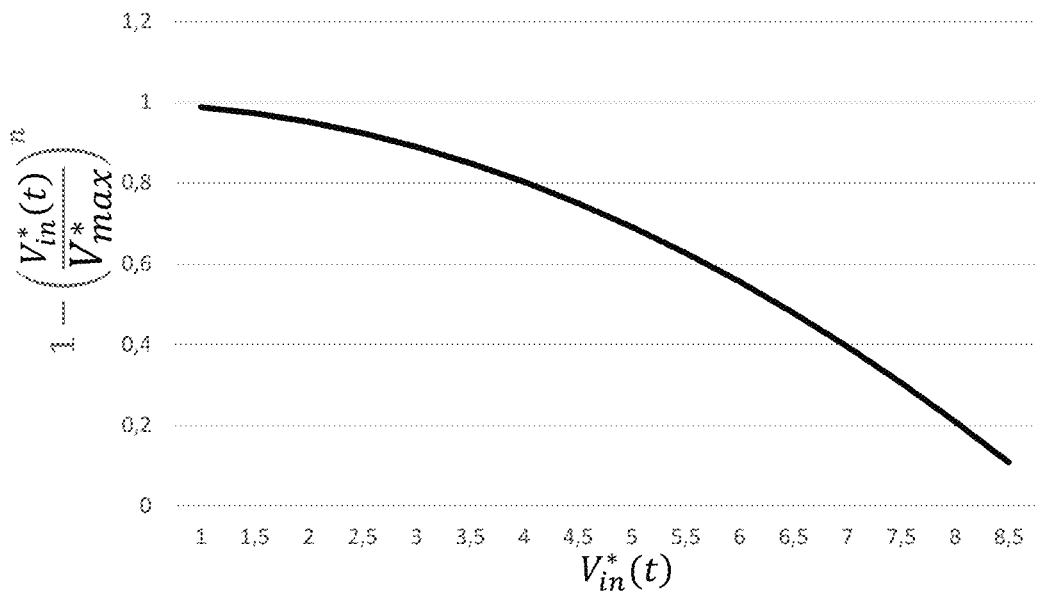
FIG. 2E shows a trend of a moderation term of the amplification gain as a function of the root mean square value of the input signal of the amplification circuit.

FIG. 2E represents a variation of the moderation term $$\left[1-\left(\frac{V^*_{in}(t)}{V^*_{max}}\right)^n\right]$$

(y axis) as a function of $V^*_{in}(t)$ (x axis–volts), by considering $V^*_{max}=9$ V and n=3. As previously indicated, the moderation term forms a decreasing function of $V^*_{in}(t)$. It allows an adjustment of the amplification gain g(t) at the input signal of the amplification circuit, the gain being all the lower when the input signal is high.

In the preceding example, the nonlinearity of the amplification gain g(t) with respect to $V^*_{in}(t)$ is induced by the moderation term $$\left[1-\left(\frac{V^*_{in}(t)}{V^*_{max}}\right)^n\right].$$

Figure 2F:
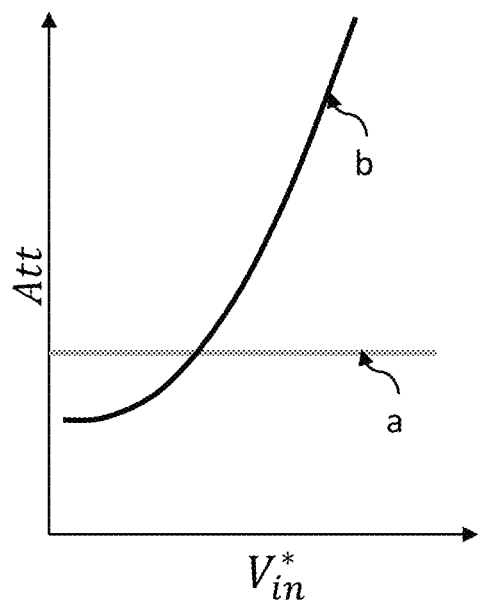
FIG. 2F schematically represents the attenuation of the vibration of a plate, as a function of the vibration amplitude, in the case of a linear behavior (curve a) and of a nonlinear behavior (curve b).

Another source of nonlinearity can be the behavior of the plate 10, because of dissipations leading to an attenuation of the amplitude of the oscillations, the attenuation being all the more marked as the amplitude increases. FIG. 2F schematically represents the attenuation of the oscillations induced by the plate, when the latter exhibits a linear behavior (curve a) and a nonlinear behavior (curve b). FIG. 2F represents the attenuation (y axis) as a function of the amplitude of the oscillations (x axis). The nonlinear amplification of the oscillator can thus be partially or totally induced by the plate. Thus, to obtain a stable self-oscillation, when the plate exhibits a strongly nonlinear behavior, that is to say when the attenuation increases rapidly as a function of the amplitude of the oscillations, the amplifier 23 could implement a linear amplification, the amplification gain g(t) being constant.

However, the recourse to a nonlinear and parameterizable amplification gain is advantageous, because it makes it possible to adjust the response of the system as required, depending on whether the aim is to prioritize the dynamic range or the sensitivity or the linearity of the force signal with respect to the intensity of the force applied.

Figure 3A:
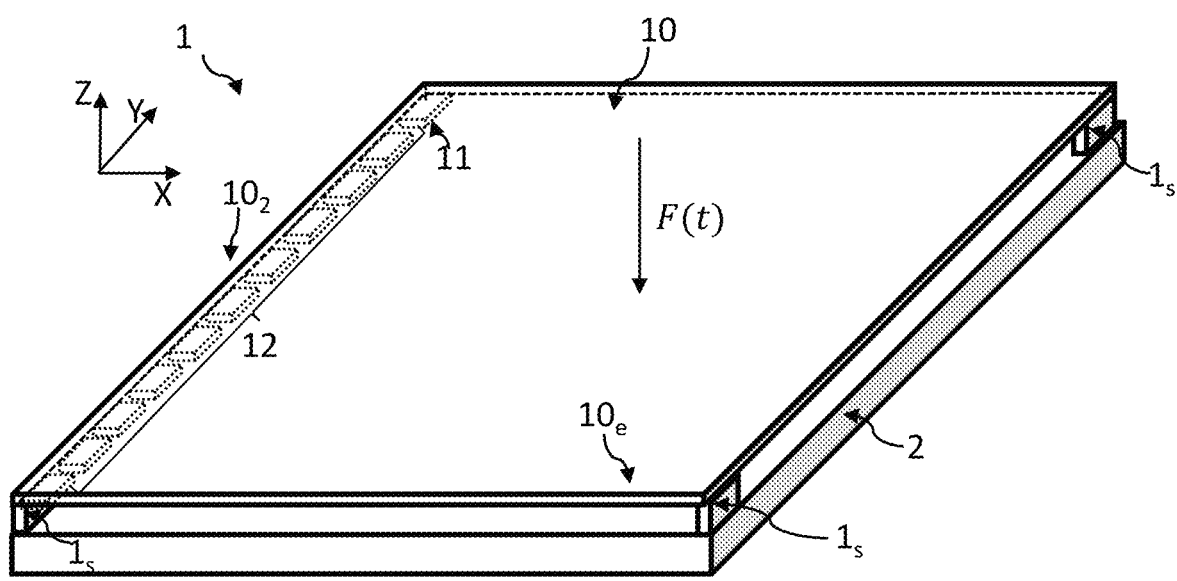
FIG. 3A schematically represents an interface used to perform experimental tests.

Experimental measurements were performed by using an interface comprising a glass plate, 1 mm thick and with dimensions of 15 cm×20 cm. FIG. 3A schematically represents the setup. The plate 10 comprised 11 piezoelectric transducers, of Ceramtec PZT406 type. The transducers were regularly distributed along one and the same second lateral border $10_2$ of the plate. Ten transducers operated as actuation transducer 12, while one transducer, situated at an end of the border, operated as detector 11. The plate 10 was disposed on a balance 2, so as to measure the force applied over the time, according to a sampling frequency of 100 Hertz. Supports is provided the interface between the plate and the balance. A force was applied locally, at a predefined point of the plate. The amplification circuit 20 implemented an amplification gain g(t) as explained in Expression (2). The parameters of the gain g(t) were: α=2, $G_c$=0.15, $V^*_{max}$=2V, n=2. A force F(t) was applied with variable intensity over time. The RMS value $V^*_{in}(t)$ of $V_{in}(t)$, the gain g(t) as well as the oscillation frequency of $V_{in}(t)$, and the force F(t) were measured, at different instants t.

Figure 3B:
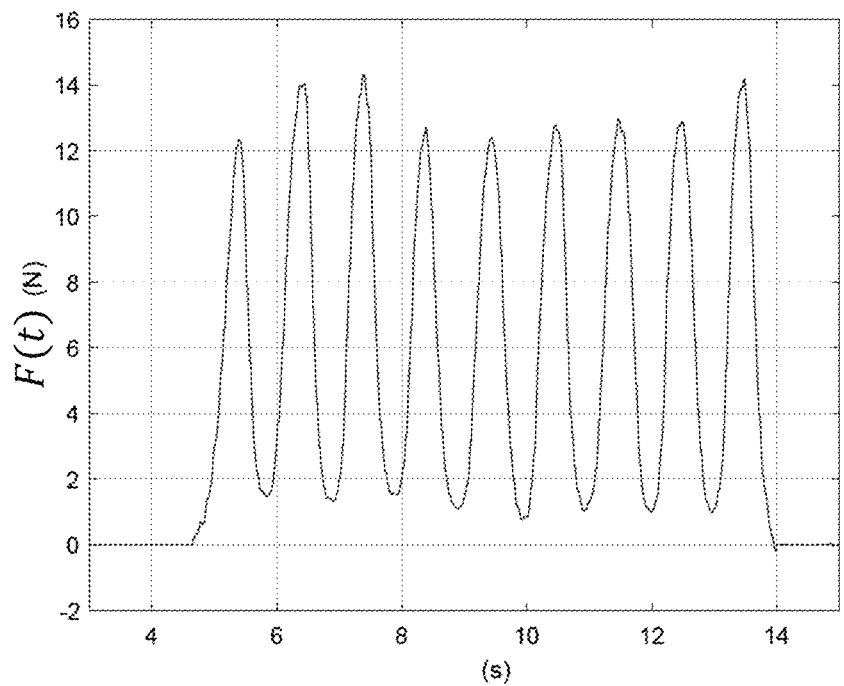
FIG. 3B shows different force intensities applied to the interface, as a function of time, during the experimental tests.
Figure 3C:
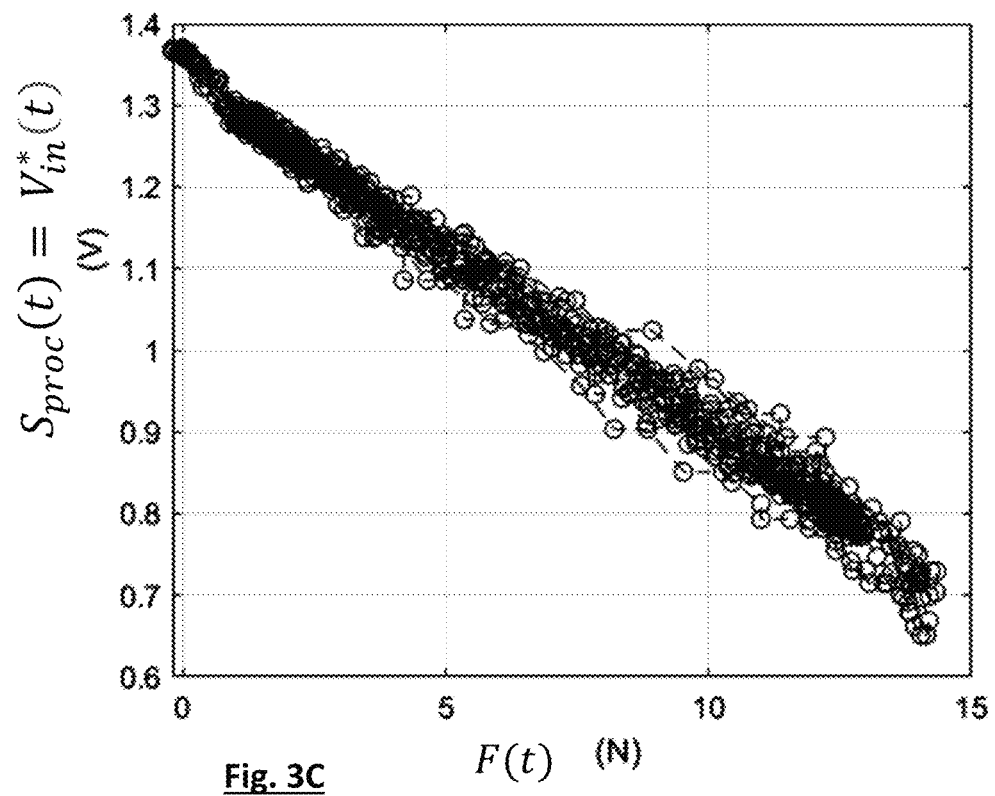
FIGS. 3C, 3D and 3E show different processing signals as a function of the intensity of the force applied. The processing signals are, respectively, the effective amplitude of the input signal (FIG. 3C), the amplification gain (FIG. 3D), and the frequency of the input signal (FIG. 3E).
Figure 3D:
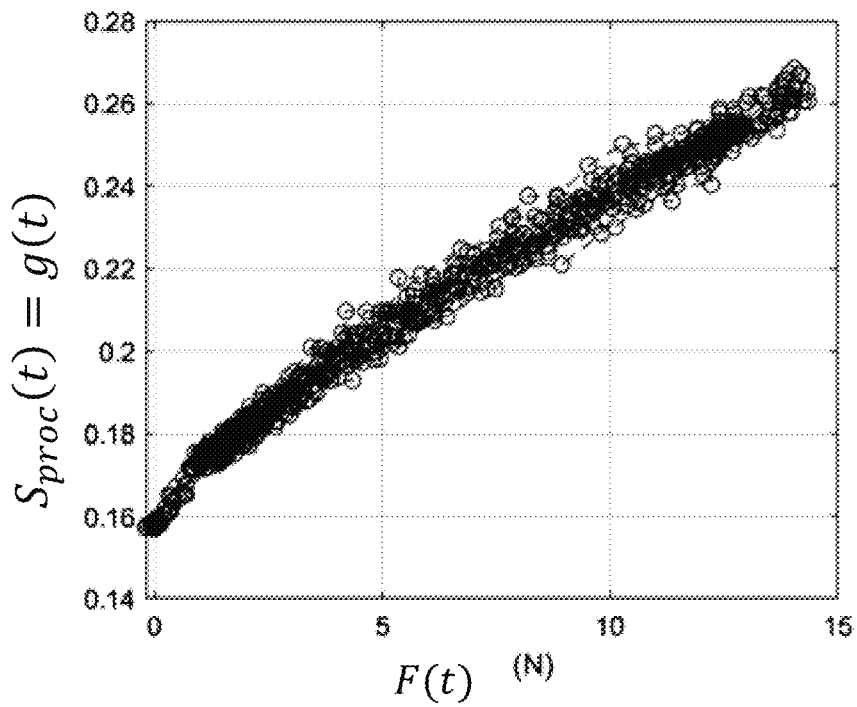
Figure 3E:
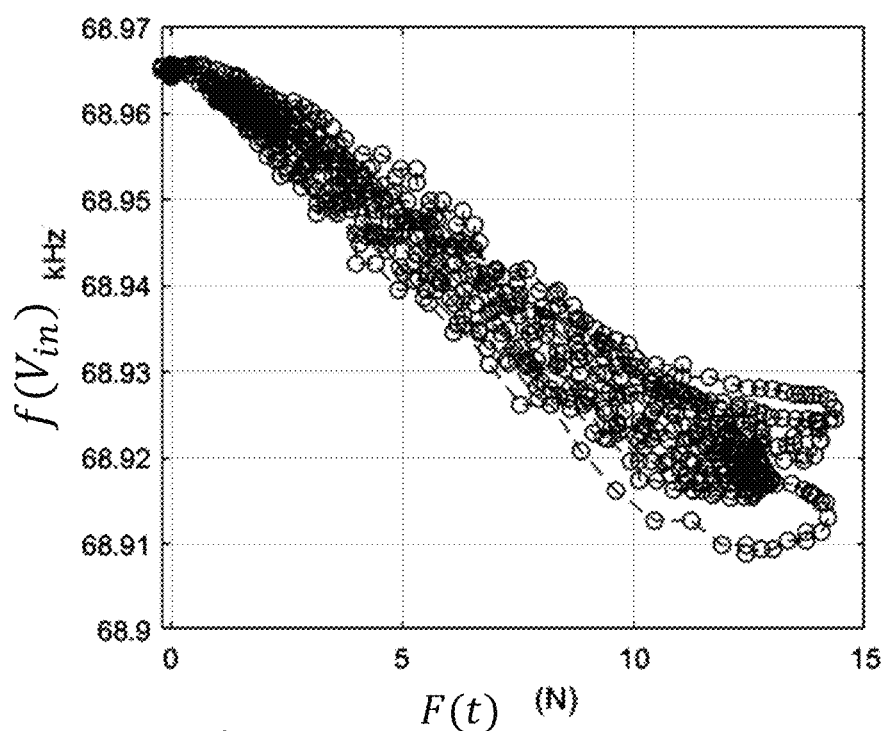

FIG. 3B represents the trend over time of the force applied to the plate during a test. The force was applied periodically, with a period of approximately 1 s. At different instants, a processing signal $S_{proc}(t)$ was measured, the latter being either:

the RMS value $V^*_{in}(t)$ of $V_{in}(t)$: see FIG. 3C; or
the amplification gain g(t): see FIG. 3D; or
the oscillation frequency $f(V_{in})$ of $V_{in}(t)$: see FIG. 3E.

In FIGS. 3C, 3D and 3E, the x axis corresponds to the intensity of the force applied (unit N in Newtons), and the y axis corresponds to the value of the processing signal $S_{proc}(t)$ FIGS. 3C to 3E show the dependence of each processing signal with respect to the intensity of the force applied.

During a series of tests, an estimation of an intensity of the force as described in U.S. Pat. No. 10,860,107 was compared to an estimation of an intensity of the force obtained by implementing embodiments of the disclosure, by using an amplification gain as explained in Expression (2), with $\alpha=2$, $G_c=0.15$, $V^*_{max}=2V$, by considering, in succession, n=0.5, n=1 and n=2. The tests were implemented as described in association with FIGS. 3B to 3E. FIG. 3F represents the force signal $V_F$ (y axis) as a function of the intensity of the force applied (x axis). FIG. 3G represents, for each configuration, an exponential adjustment of the force signal as a function of the intensity of the force applied.

When implementing the first embodiment of the method described in U.S. Pat. No. 10,860,107, the force signal corresponded to a ratio of the RMS value of the voltage measured at the terminals of the detector, to the RMS value of the voltage measured in the absence of press exerted on the plate. The results are represented in FIG. 3F (curve AA). When implementing embodiments of the disclosure, the force signal is such that $$V_F = \frac{V^*_{in}(t)}{S_{ref}}.$$

In the absence of press exerted on the plate, the force signal $V_F$ is equal to 1. When a force F is applied to the plate, the force signal $V_F$ decreases.

The sensitivity of the measurement of the force corresponds to a variation of the output signal (that is to say $V_F$) with respect to a variation of the input signal (that is to say F(t)). That corresponds to the local slope of the curves represented in FIGS. 3F and 3G. It will be observed that by implementing embodiments of the disclosure, for a shrewd choice of a value of n, a relatively constant sensitivity is obtained according to a high dynamic. The term dynamic range is understood to mean the measurement range. This is particularly borne out when n=1 or n=2. It will also be observed that, for n=1 or n=2, the trend of the force signal $V_F$ with respect to the force applied is close to a linear relationship (constant sensitivity) and that is so over a wide dynamic range (between 0 N and 15 N).

When n=0.5, the sensitivity is higher, but according to a reduced dynamic range: 0 N to 10 N. Indeed, beyond 10 N, the curve of FIG. 3G flattens.

One of the advantages of embodiments of the disclosure is being able to parameterize the amplification gain, so as to prioritize either the dynamic range (n=1 or n=2 in this example), or the sensitivity within a reduced measurement range (n=0.5). Another advantage is being able to obtain a force signal that varies linearly with respect to the intensity of the force applied.

Figure 3F:
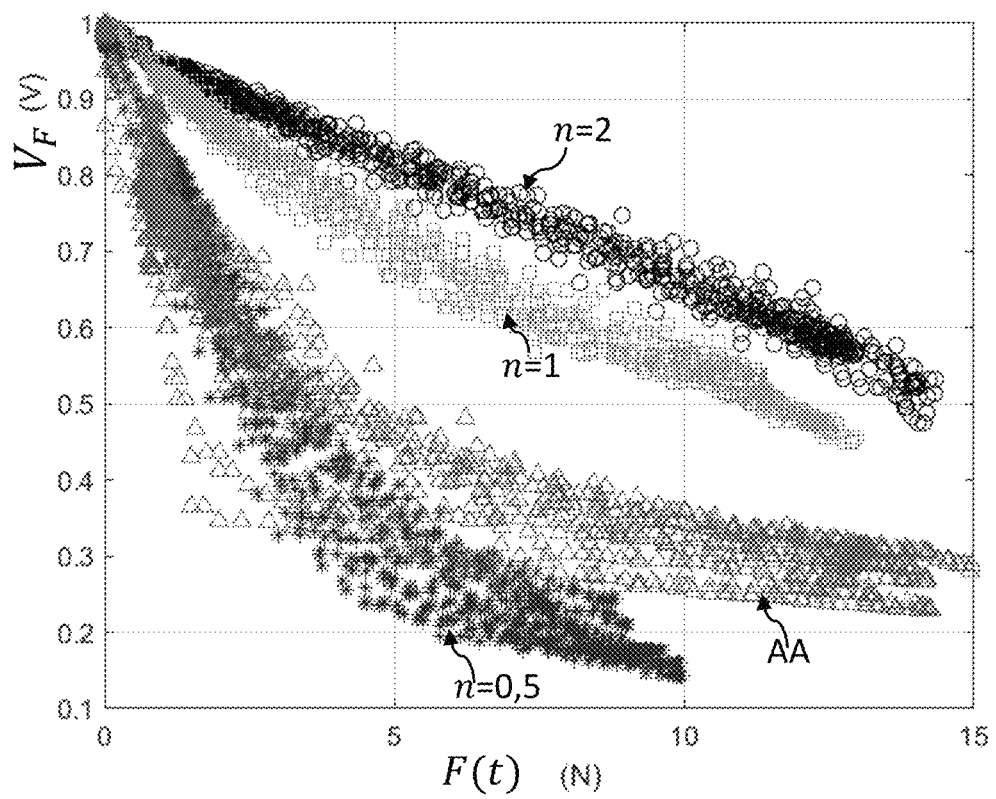
FIG. 3F represents different force signals measured as a function of intensities of forces applied to the interface. Each point of the figure corresponds to a pairing of force intensity and force signal.
Figure 3G:
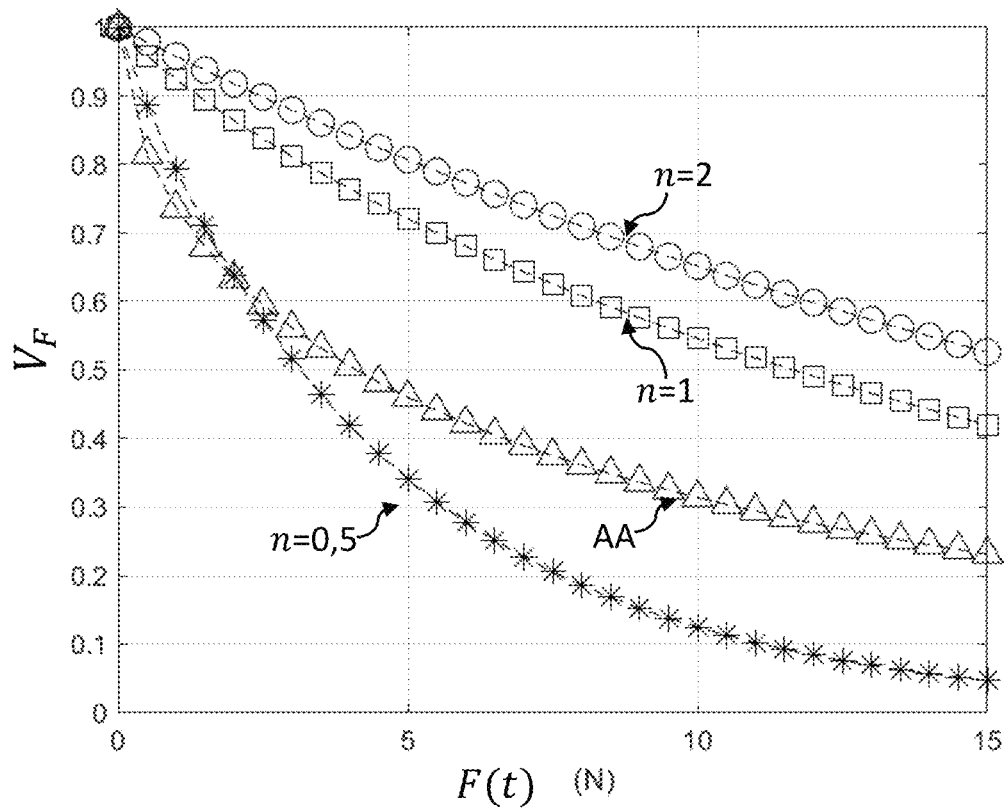
FIG. 3G shows the curves of adjustment of the clouds of points of FIG. 3F by taking account of an exponential adjustment function.

FIGS. 3F and 3G show that embodiments of the disclosure make it possible to obtain a better sensitivity within a more extended measurement range than according to the prior art. Indeed, the curves representative of the prior art show a flattening effect occurring earlier, that is to say from lower force intensities than by implementing embodiments of the disclosure.

Figure 4A:
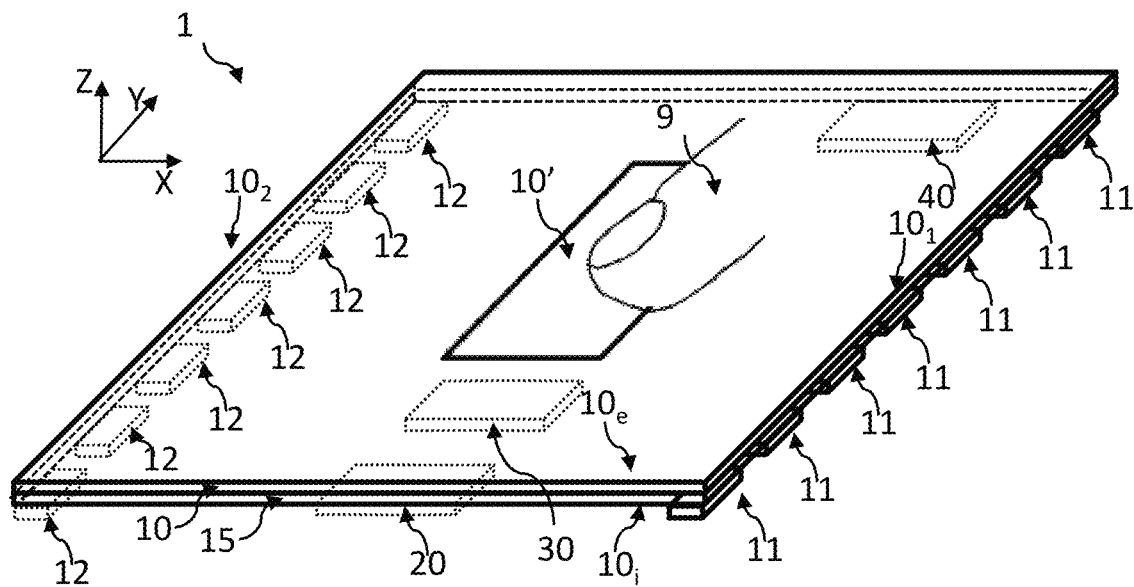
FIGS. 4A and 4B represent a second embodiment of a touch interface, in which the touch interface comprises a capacitive screen.
Figure 4B:
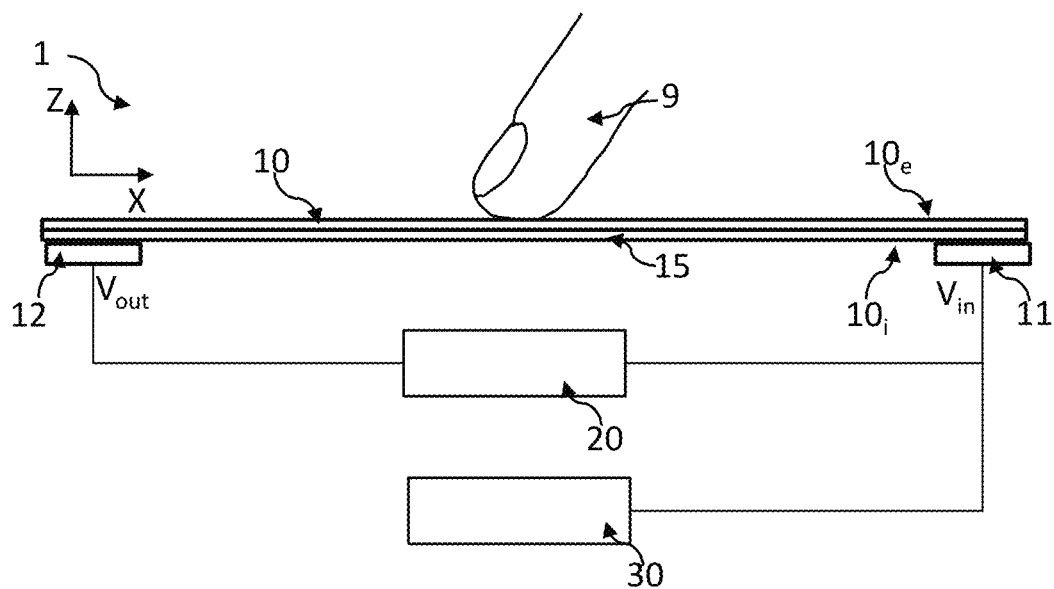

FIGS. 4A and 4B illustrate another embodiment, according to which an intermediate component 15 extends between the detectors 11, as well as the actuation transducers 12, and the plate 10. In this example, the intermediate component 15 is a screen (referred to herein as "screen 15"), allowing a display of an image through the plate 10, the latter being transparent. According to this embodiment, the detectors and actuation transducers are not disposed in contact with the plate 10. They are mechanically coupled to the plate 10 via the screen 15. The latter is rigid enough to transmit the vibrations between the plate 10 on the one hand and the actuation transducers 12 and detectors 11 on the other hand.

According to one possibility, mechanical amplifiers, usually called "boosters," can be interposed between the actuation transducers and the plate. Such amplifiers are components that make it possible to amplify a vibration amplitude of the plate. Such mechanical amplifiers are described in WO2020141264.

Figure 4C:
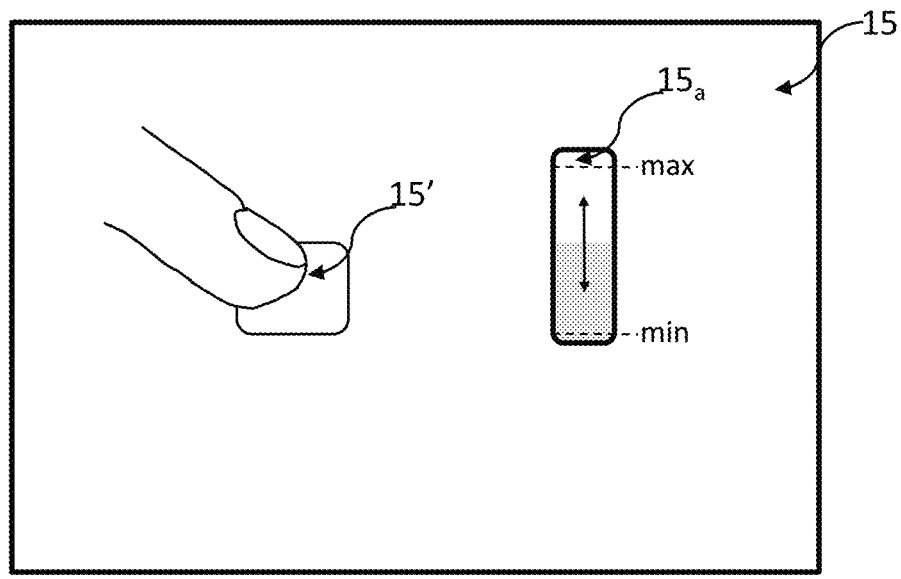
FIGS. 4C and 4D illustrate examples of implementation of the touch interface described in association with FIGS. 4A and 4B.

The screen 15 can make it possible to view the setting zone 10', and possibly view the value of the operating parameter that is wanted to be adjusted. FIG. 4C represents an example of interface configuration, in which the setting zone 10' is delimited, on the screen 15, by an outline. The screen also shows a gauge $15_a$, extending between a minimum value min and a maximum value max. The greater the force exerted by the finger on the setting zone 10', the more the gray zone, inside the gauge, approaches the maximum level.

Figure 4D:
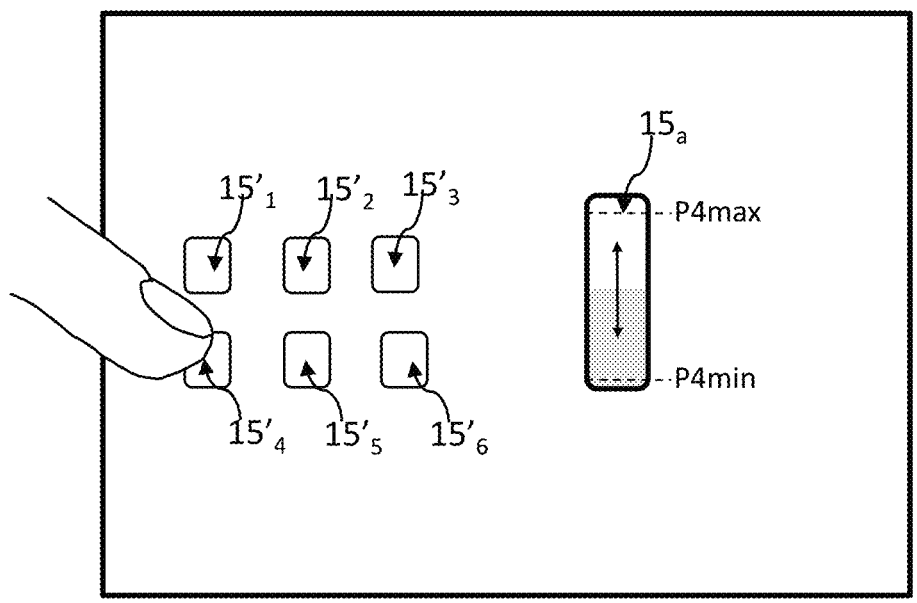

The screen 15 can be provided with a locating circuit, for example a capacitive circuit, allowing the press of the finger on the screen 15 to be located, through the plate 10. In FIG. 4D, six setting zones of the plate are represented, respectively delimited, on the screen, by the outlines $15'_1$, $15'_2$, $15'_3$, $15'_4$, $15'_5$ and $15'_6$. Each setting zone is respectively dedicated to setting an operating parameter $P_1$, $P_2$, $P_3$, $P_4$, $P_5$ and $P_6$. When a finger contacts a setting zone, the location of the press point makes it possible to identify the operating parameter that the user wants to set. In the example represented in FIG. 4D, a setting of the operating parameter $P_4$, between a value $P_{4min}$ and a value $P_{4max}$ is represented. The screen makes it possible to display a gauge 15', so as to view the setting of the operating parameter that it is wanted to be adjusted. According to this embodiment, the control unit 40 establishes a control signal as a function of a force level resulting from the processing unit 30, and as a function of a position of the press point resulting from the locating circuit.

Figure 5A:
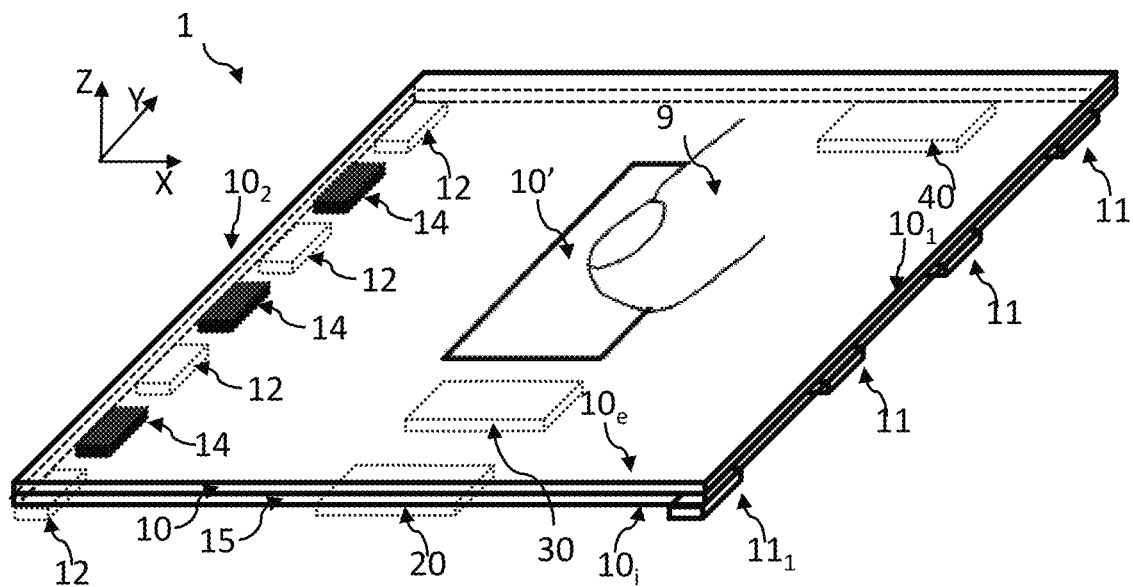
FIG. 5A schematically represents an embodiment of an interface comprising actuation transducers making it possible to induce a haptic feedback from the interface.

According to one embodiment, represented in FIG. 5A, the plate can be made to vibrate by auxiliary transducers 14, so as to induce an ultrasonic vibration of the plate. Contrary to the actuation transducers 12, the auxiliary transducers are powered by a setpoint actuation signal, defining a vibration amplitude and frequency. The ultrasonic vibration can induce a haptic effect on the finger touching the interface, that is to say a sensation of texture or a click sensation in particular as a function of the intensity of the pressing force F detected. Thus, the term haptic feedback is understood to mean making the plate vibrate, according to a predetermined temporal vibration sequence, and according to an ultrasonic frequency, the temporal frequency being configured to drive a sensation of texturing of the plate by the external body touching the plate. As is known to the person skilled in the art, the vibration leads to a modification of the friction between the external body and the plate, which induces a perception of texturization. The haptic feedback can consist in making the plate vibrate, according to a predetermined setpoint amplitude, for a brief time, for example a few tens or hundreds of ms. Unlike the operation according to an oscillator mode, as previously described, when wanting to obtain a haptic effect, the plate is made to vibrate according to a predetermined vibration amplitude.

According to this embodiment, when the pressing force reaches a threshold value, the plate can be made to vibrate so as to induce a haptic effect felt by the finger. The haptic effect forms a haptic feedback of the interface. Also, referring to FIG. 2A following the step 140, a step 160 can be implemented, aiming to produce the haptic feedback.

Figure 5B:
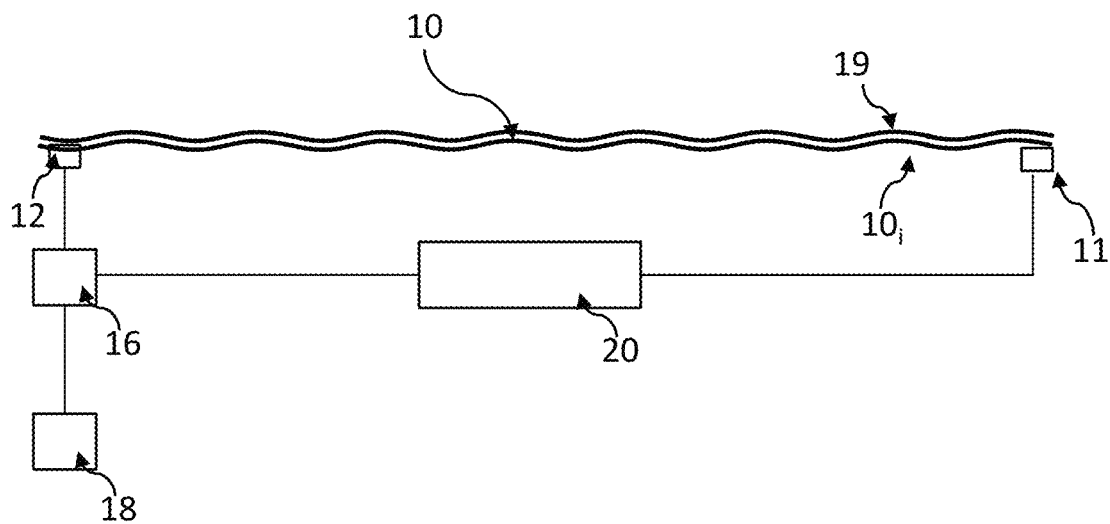
FIG. 5B is a variant of the embodiment described in association with FIG. 5A.

Alternatively in another embodiment, represented in FIG. 5B, an actuation transducer 12 or each actuation transducer is linked to a switch 16. Each switch 16 is configured to link the actuation transducer either:
- to the amplification circuit 20: the plate then vibrates according to a spontaneous, self-sustaining oscillation regime: the device then allows an estimation of a pressing force; or
- to an auxiliary power supply 18, imposing a setpoint signal according to a setpoint frequency and a setpoint vibration amplitude: the device then operates according to a conventional ultrasonic haptic interface. The actuation transducer 12 then behaves as an auxiliary transducer 14.

The switch 16 can make it possible to switch between the two modes, either:
- the self-sustaining oscillation mode, when the actuation transducer is linked to the amplification circuit 20, so as to measure a pressing force; or
- a forced vibration mode, according to a setpoint frequency and amplitude, so as to induce a haptic feedback. The actuation transducer then forms an auxiliary transducer.

Embodiments of the disclosure will be able to be applied to form a control interface of devices, for example consumer devices, for example in the field of domestic electric appliances or vehicle dashboards. The embodiments can also be applied in professional equipment interfaces.

The invention claimed is:

1. A user interface, comprising:
   a plate, defining a contact surface configured to be touched by an external body;
   at least one actuation transducer, configured to make the plate vibrate, as a function of an activation signal;
   at least one detector configured to detect an amplitude of a vibration of the plate or to generate a detection signal, the detection signal oscillating according to an oscillation amplitude dependent on the detected vibration amplitude;
   an amplification circuit, extending between an input and an output, the input being connected to the detector and the output being connected to the actuation transducer;
   wherein:
   the amplification circuit is configured to be powered by an input signal, the input signal being an oscillating signal established from the detection signal;
   the amplification circuit comprises an amplifier, configured to amplify the input signal, by applying to it an amplification gain, so as to address an output signal to the actuation transducer, the output signal corresponding to the amplified input signal, the output signal forming the activation signal of the actuation transducer;
   the amplification gain depends, nonlinearly, on the input signal;
   the or each detector, the or each actuation transducer, and the amplification circuit form a feedback loop;
   the plate and the feedback loop form a self-sustaining oscillator;
   and wherein the interface comprises a processing unit, powered by a processing signal, the processing signal depending on the input signal or on the detection signal, the processing unit being configured to:
   compare the processing signal with a reference signal;
   generate a force signal, based on the comparison of the processing signal with a reference signal, the force signal being representative of an intensity of a pressing force exerted on the plate by the external body touching the contact surface of the plate.

2. The interface of claim 1, wherein, in the absence of force exerted on the plate by the external body, the reference signal corresponds to the processing signal.

3. The interface of claim 1, wherein the processing signal is established from:
   a quantity characteristic of the input signal, the characteristic quantity quantifying the oscillation amplitude of the input signal;
   and/or an oscillation frequency of the input signal.

4. The interface of claim 1, wherein the amplification gain depends on a characteristic quantity of the input signal, the characteristic quantity quantifying the oscillation amplitude of the input signal.

5. The interface of claim 4, wherein the amplification gain decreases as a function of the quantity characteristic of the input signal.

6. The interface of claim 4, wherein the amplification gain comprises a maximum gain, weighted by a moderation term, such that the amplification gain is all the lower when the quantity characteristic of the input signal is high.

7. The interface of claim 4, wherein the amplification gain is maximal when the quantity characteristic of the input signal reaches a predetermined minimum value.

8. The interface of claim 4, wherein the amplification gain is minimal when the quantity characteristic of the input signal reaches a value greater than or equal to a threshold value.

9. The interface of claim 1, wherein a screen is attached to the plate, all or part of the plate being transparent.

10. The interface of claim 1, wherein the plate vibrates at a resonant vibration frequency lying between 20 kHz and 200 kHz.

11. The interface of claim 1, wherein:
    at least one actuation transducer is a piezoelectric transducer;
    and/or at least one detector is a piezoelectric transducer.

12. The interface of claim 1, comprising a control unit, the control unit being configured to address a control signal to a device, linked to the interface, as a function of the force signal.

13. The interface of claim 1, comprising a locating circuit, configured to determine a position of a point of contact between the external body and the plate.

14. The interface of claim 1, comprising a filter, disposed between the detector and the amplification circuit, the filter being configured to define a frequency bandwidth of the input signal addressed to the amplification circuit.

15. The interface of claim 1, wherein:
the plate is linked to at least one auxiliary transducer distinct from an actuation transducer, the auxiliary transducer being connected to an auxiliary power supply, the auxiliary transducer being configured to make the plate vibrate, according to a predetermined setpoint vibration amplitude, and according to an ultrasonic vibration frequency so as to produce an haptic feedback effect;
the interface is configured to activate the auxiliary transducer, or each auxiliary transducer, when the force signal crosses a predetermined threshold.

16. The interface of claim 1, wherein an actuation transducer is connected to a switch, the switch being configured to:
connect the actuation transducer to the amplification circuit, so as to measure the force exerted on the plate;
or connect the actuation transducer to an auxiliary power supply, such that the auxiliary power supply applies a setpoint signal to the actuation transducer the actuation transducer being then configured to make the plate vibrate, according to a predetermined setpoint vibration amplitude, and according to an ultrasonic vibration frequency, so as to produce a haptic feedback effect.

17. A method for estimating a force exerted on a plate of the interface of claim 1, the method comprising:
a) applying an external body to the plate, by exerting a pressing force on the plate;
b) using the processing unit, estimating an intensity of the pressing force applied by the external body to the plate.

18. A method for controlling a device, using the interface of claim 1, the device being parameterized by at least one operating parameter, the method comprising:
applying an external body to the plate, by exerting a pressing force on the plate;
determining an intensity of the force, using the processing unit of the interface;
based on the intensity of the force, generating a control signal, via the interface, so as to adjust a value of the operating parameter of the device.

19. The method of claim 17, wherein the external body is a finger or a stylus.

* * * * *